United States Patent [19]
Brown

[11] Patent Number: 5,676,746
[45] Date of Patent: *Oct. 14, 1997

[54] AGGLOMERATES FOR USE IN MAKING CELLULOSIC PRODUCTS

[75] Inventor: Alan J. Brown, Vancouver, Wash.

[73] Assignee: Columbia River Carbonates, Woodland, Wash.

[*] Notice: The term of this patent shall not extend beyond the expiration date of Pat. No. 5,653,795.

[21] Appl. No.: 419,890

[22] Filed: Apr. 11, 1995

[51] Int. Cl.$^6$ .................................... C09C 1/02
[52] U.S. Cl. ............... 106/465; 106/416; 106/419; 106/437; 106/445; 106/447; 106/448; 106/460; 106/464; 106/465; 106/471; 106/491; 162/135
[58] Field of Search ................... 106/464, 465, 106/416, 419, 437, 445, 447, 448, 460, 471, 491; 162/135

[56] References Cited

U.S. PATENT DOCUMENTS

| | | | |
|---|---|---|---|
| 2,176,876 | 10/1939 | Alessandroni | 106/423 |
| 3,014,836 | 12/1961 | Proctor, Jr. | 162/181.8 |
| 3,663,461 | 5/1972 | Witt | 528/405 |
| 3,804,656 | 4/1974 | Kaliski et al. | 106/487 |
| 4,026,762 | 5/1977 | Bauman | 162/181.2 |

(List continued on next page.)

FOREIGN PATENT DOCUMENTS 2016498  9/1979  United Kingdom .
2125838  3/1984  United Kingdom .

OTHER PUBLICATIONS

Passaretti, et al., "Application of High–Opacity Precipitated Calcium Carbonate," *Tappi Journal* 76:135–140 (1993). (No Month).

*Primary Examiner*—Mark L. Bell
*Assistant Examiner*—Scott L. Hertzog
*Attorney, Agent, or Firm*—Klarquist Sparkman Campbell Leigh & Whinston, LLP

[57] ABSTRACT

A process is provided for the selective aggregation of the fine and ultrafine particles present in an anionically or cationically dispersed mineral pigment slurry, such that an aggregated structure is formed which contains within it a labyrinth of internal voids or pores, which collectively function as light scattering centers. The aggregates are formed from an assemblage of fine mineral particles, interconnected or bonded together with small quantities of a cationic or anionic polymer or agent of low molecular weight. The resultant aggregates are of larger mean particle size than the feed material and contain little or no fine and colloidal particles. The net charge present on the aggregated particles is lower than that of the feed material. These mineral aggregates are then of a suitable size and surface charge to be retained well in a fiber web by a combination of filtration retention and adsorption retention, and provide added bulk and opacity to the finished sheet of paper. The high solids, aggregated, products of this invention can also be used to enhance the optical properties, smoothness, printing properties and surface coverage of coated paper and paper board.

10 Claims, 31 Drawing Sheets

U.S. PATENT DOCUMENTS

| | | | |
|---|---|---|---|
| 4,028,173 | 6/1977 | Olson | 162/181.2 |
| 4,076,548 | 2/1978 | Bundy et al. | 106/416 |
| 4,078,941 | 3/1978 | Bundy et al. | 106/409 |
| 4,115,187 | 9/1978 | Davidson | 162/168 R |
| 4,167,420 | 9/1979 | Linden et al. | 106/447 |
| 4,167,421 | 9/1979 | Linden et al. | 106/447 |
| 4,174,279 | 11/1979 | Clark et al. | 210/736 |
| 4,381,948 | 5/1983 | McConnell et al. | 106/416 |
| 4,610,801 | 9/1986 | Matthews et al. | 252/181 |
| 4,714,603 | 12/1987 | Vanderheiden | 423/432 |
| 4,732,748 | 3/1988 | Stewart et al. | 423/430 |
| 4,738,726 | 4/1988 | Pratt et al. | 106/487 |
| 4,824,654 | 4/1989 | Ota et al. | 423/432 |
| 4,888,160 | 12/1989 | Kosin et al. | 423/430 |
| 4,892,590 | 1/1990 | Gill et al. | 106/464 |
| 4,900,533 | 2/1990 | Malden | 423/430 |
| 4,943,324 | 7/1990 | Bundy et al. | 106/486 |
| 5,006,574 | 4/1991 | Sennett et al. | 523/351 |
| 5,068,276 | 11/1991 | Suitch et al. | 524/413 |
| 5,076,846 | 12/1991 | Buri et al. | 106/401 |
| 5,082,887 | 1/1992 | Brown et al. | 524/413 |
| 5,112,782 | 5/1992 | Brown et al. | 501/144 |
| 5,169,441 | 12/1992 | Lauzon | 106/416 |
| 5,203,918 | 4/1993 | Rice | 106/486 |
| 5,207,822 | 5/1993 | Manasso et al. | 106/416 |
| 5,236,989 | 8/1993 | Brown et al. | 524/413 |
| 5,261,956 | 11/1993 | Dunaway et al. | 106/416 |
| 5,279,663 | 1/1994 | Kaliski | 106/486 |
| 5,298,066 | 3/1994 | Shurling, Jr. et al. | 106/487 |
| 5,317,053 | 5/1994 | Brown et al. | 524/425 |
| 5,320,672 | 6/1994 | Whalen-Shaw | 106/287.24 |
| 5,336,311 | 8/1994 | Curtis et al. | 106/416 |
| 5,384,013 | 1/1995 | Husband et al. | 162/168.1 |

AGGLOMERATES FOR USE IN MAKING CELLULOSIC PRODUCTS

FIELD OF THE INVENTION

The present invention relates to mineral products that are used in the process of making products from cellulosic pulp. In particular, the invention relates to fillers and coatings used in papermaking.

BACKGROUND OF THE INVENTION

In the process of making paper and paper board, mineral particles such as calcium carbonate, dolomite, calcium sulphate, kaolin, talc, titanium dioxide, kaolinite based pigments or aluminum hydroxide are often used as fillers and pigments. These inorganic materials are incorporated into the fibrous web in order to improve the quality of the resulting product. In the absence of such "fillers" the web or sheet of paper or paper board can have a relatively poor texture due to discontinuities in the fibrous web. The use of fillers is important in improving the printing characteristics of the paper or board by a mechanism of improving surface smoothness. Fillers also vastly improve the opacity and brightness of a sheet of paper of a given weight. The bulk of a sheet of paper is also very important as paper is sold by area and not weight. Bulky paper can be calendered or "finished" more than thin paper to produce a smoother sheet, which prints better. The web strength of a sheet of paper generally declines as filler is substituted for fiber, so a preferred filler would have least impact on fiber to fiber bonds and maintain the strength of the paper web at high filler levels.

A number of inorganic materials have long been known to be effective as fillers in the manufacture of paper related products. Among the best of these materials is titanium dioxide, which can be incorporated into the paper in the form of anatase or rutile. Titanium dioxide, which has a higher refractive index than other naturally occurring minerals, however, is one of the most expensive materials that can be used for this purpose. It is also very abrasive. Thus despite its effectiveness as an opacifying filler, its use is limited and cheaper more satisfactory replacements are much sought after.

The properties which render an inorganic material, or pigment, of value as a filler are well known. These include low abrasion, as well as high brightness and opacifying characteristics. The low abrasion is significant in order to assure that the resultant paper product can be manufactured and converted easily with conventional machinery. The brightness and opacifying characteristics are important in producing an acceptable sheet of paper, or board, one which incorporates whiteness, high opacity, good printability, and an optimum bulk/weight ratio. Mineral aspect ratio is also of importance as pigments with high aspect ratios are known to enhance the surface smoothness and printability of super-calendered papers and those printed by the rotogravure process.

The brightness and opacifying characteristics of a pigment when incorporated as a filler in a sheet of paper, may be quantitatively related to a property of the filler identified as the "scattering coefficient, S". The scattering coefficient, S, of a given filler pigment is a property well known and extensively utilized in papermaking and has been the subject of many technical papers. The earliest exposition of such measurements was made by Kubelka and Munk, and is reported in Z. Tech. Physik 12:539 (1931). Further citations to the applicable measurement techniques and detailed definitions of the said scattering coefficient can be found in U.S. Pat. Nos. 4,026,726 and 4,028,173, as well as in Pulp and Paper Science Technology, Vol 2 "Paper", Chapter 3, by H. C. Schwalbe (McGraw-Hill Book Company, N.Y.).

Among the materials that have found acceptance as fillers in papermaking are calcined kaolins. These pigments, described by Proctor in U.S. Pat. No. 3,014,836, and McConnell et al in U.S. Pat. No. 4,381,948, are structured, i.e. "formed from an assemblage of platelets interconnected or bonded together to form aggregates which include a network of platelets". This creates a high number of internal voids or pores, which function as light scattering centers. Typical feed kaolins used in the calcination process contain of the order of 100% by weight of particles finer than two microns, such a fine feed material is required in order that the calcined and aggregated product contains within it pores of a size suitable to scatter light. Unfortunately, these calcined kaolins have higher abrasion than natural or un-calcined kaolins, and are relatively expensive to produce which limits their applicability as paper filling pigments. Calcined kaolins, because of their low bulk density, also disrupt the fiber to fiber bonds of the paper web at high filler loads, thereby significantly weakening the strength of a sheet of paper relative to other higher bull density pigments. Additionally, these paper filing pigments can not be dispersed at high solids and have poor high shear rheology. An extension of this technology disclosed in U.S. Pat. No. 5,261,956 by Dunnaway et al, describes a method for improving the rheology of calcined kaolin pigments such that they find application as coating pigments. Unfortunately, the milling process described by Dunnaway results in a partial degradation of the internal structure of the calcined clay, and reduces the efficiency of the product as a light scattering pigment.

Many paper products are manufactured in the neutral or alkaline pH range. These products are very amenable to the inclusion of alkaline metal carbonates and sulfates as fillers, unlike papers made in the acid pH range. One known method of preparing a precipitated alkaline earth metal carbonate, is to calcine a naturally occurring alkali metal carbonate, such as limestone or dolomite, in order to drive off chemically combined carbon dioxide and leave the alkali earth metal oxide. The alkali metal earth oxide is slaked in water to form a suspension of the alkali metal earth hydroxide, and then carbon dioxide is passed under controlled conditions through the suspension of the alkali metal earth hydroxide. Many variations of the reaction conditions have been reported, Kosin et al in U.S. Pat No. 4,888,160 teach how novel precipitated calcium carbonate products can be made by controlling reaction parameters such as pH and temperature. Malden, in U.S. Pat No. 4,900,533, teaches how to improve the brightness of a precipitated alkali metal earth carbonate during the precipitation process, while U.S. Pat. Nos. 4,714,603 describes the production of a spherically shaped precipitated alkali metal carbonate and U.S. Pat. No. 4,824,654 teaches how to produce a needle shaped precipitated alkali metal earth carbonate.

Passaretti et al (TAPPI Journal, Vol. 76 No. 12, 135–140, 1993) describe a range of precipitated alkali metal earth carbonate fillers and compare them to other fillers. The scalenohedral form of precipitated calcium carbonate imparts most opacity and bulk to a sheet of paper by virtue of its morphology, which contains internal voids that scatter light. This scalenohedral precipitated calcium carbonate filler provides bulk to the sheet of paper and can effectively replace titanium dioxide despite its lower pigment refractive index, however, the high internal pore volume of these pigments substantially retards the drainage of the paper web and can result in significant slowing of the production rate of a paper machine as described by Strutz et al, TAPPI Neutral/Alkaline Papermaking Course, October 1990, pp 99–106. The voluminous nature of this pigment type, like calcined kaolins, also significantly weakens the fiber to fiber bonds in a paper sheet at higher filler levels. In an attempt to reduce the pigments impact on sheet drainage, "prismatic" or rhombohedral precipitated calcium carbonate particles can by incorporated into the sheet of paper. Manufacture of these "solids particle" precipitated calcium carbonate pigments requires that the reaction temperature of the precipitation process is controlled at very low temperatures, which requires chilling equipment and results in expensive pigments. A major limitation of "prismatic" or rhombohedral precipitated calcium carbonate mineral fillers is that they do not enhance the bulk of a sheet of paper.

Brown et al in U.S. Pat. No. 5,082,887 describe combination pigments consisting of a mixture of scalenohedral precipitated calcium carbonate and kaolin that have been chemically fused together by calcium ions that cross link a high molecular weight polyacrylic acid molecule. These pigments contain additional light scattering voids but have to be dried prior to use which increases their cost of manufacture.

Other filler minerals that can be used at neutral or alkaline pH are ground natural calcium carbonate, dolomite or gypsum. During production of these fine particle size fillers anionic dispersants are typically added to the mineral suspension resulting in particles that carry a net negative surface charge. Brown et al in U.S. Pat. No. 5,317,053 teach the production of high solids anionically dispersed aqueous slurries of particulate calcium carbonates with highly stable characteristics. The rhombohedral particle shape of naturally ground calcium carbonates, low surface area of the pigment, and lack of internal porosity results in good drainage of a paper web; however, the filler particles are generally poorly retained in the fiber matt, do not produce much bulk, and result in a low scattering coefficient as described by Passaretti et al.

Calcined kaolin pigments are much more hydrophobic than regular or hydrous kaolin pigments. As a consequence of this surface hydrophobicity, post calcining processing steps must be taken to aid the dispersion of the pigment in water. Dunnaway et al in U.S. Pat. No. 5,261,956 disclose the milling procedures necessary to aid dispersion of a calcined clay in water. These milling procedures partially degrade the aggregated structure of the calcined clay as evidenced by a reduction in the internal pore volume of the product, and necessarily reduce the performance of the pigment as a light scattering filler.

The porous nature of calcined clays results in mineral slurries that are dilatent at high solids, typical paper filling grade calcined clays must be transported to a paper mill at approximately 50% solids in water, or shipped as dry powder and slurried on-site at the mill. Both of these approaches are less cost effective than the transportation of a high solids anionically dispersed kaolin mineral pigment slurry to a paper mill.

Bundy et al in U.S. Pat. No. 4,078,941 disclose a process for producing a "high bulking" calcined clay. The feed clay for the calcining process is selectively flocculated to produce a higher internal pore volume upon calcining. The product of this process provides higher light scattering potential relative to the products of Proctor and McConnell above, however the lower bulk density of the product disclosed by Bundy et al would be expected to have a greater disruptive effect on fiber to fiber bonding, or sheet strength of a paper web. These "high bulking" calcined products would have similar pigment abrasions to the products disclosed by Proctor and McConnell, which is significantly higher than a hydrous or un-calcined kaolin.

In another approach to resolve some of the negative properties of calcined clays, Manasso et al disclose a synergistic filler blend for wood containing papers in U.S. Pat. No. 5,207,822. Here some 25 to 50% of the filler composition is an un-calcined, or hydrous, kaolin ("Astra-plus"; disclosed in U.S. Pat. No. 4,943,324) which has been delaminated and had most of the particles finer than 0.3 microns removed by a fractionation process such as centrifugation. The balance of the filler blend is a fine calcined clay. This invention would be expected to reduce the abrasion of the filled paper by virtue of the low abrasion hydrous kaolin component. The delaminated and fines removed hydrous kaolin component, "Astra-plus", would be expected to contribute light scattering to the web or sheet of paper because fines deficient platy kaolin pigments are known to have poor particle packing characteristics, which result in inter-particle voids or light scattering centers. A disadvantage of this approach is that two separate filler pigments have to be delivered to the paper mill. Both pigments possess poor high shear rheology by virtue of internal structure or poor particle packing characteristics, which severely limits the attainable solids of a slurry of these pigments relative to conventional anionically dispersed hydrous kaolin pigment slurries. Furthermore, both the pigments of this invention are more expensive to produce than regular hydrous kaolin pigments.

Pratt et al in U.S. Pat. No. 4,738,726 disclose the composition of a "high bulking" kaolin pigment that is composed solely of hydrous or un-calcined clay particles. In the process, a feed kaolin mineral slurry with a particle size distribution containing less than 35% of the particles finer than 0.3 microns, is flocculated with a cationic polyelectrolyte to produce a "high bulking" pigment. Such a feed mineral slurry typically has only 55–60% of particles finer than two microns and has to be fractionated prior to treatment to remove the coarser particles. The product is dewatered, or thickened, to form a mineral slurry at 62% solids which is shipped to the paper mill for use as a paper filling or paper coating pigment. The pigments disclosed by Pratt would be more expensive to produce than regular or anionically dispersed kaolin pigment slurries, and would incur higher delivery costs than regular or hydrous kaolin pigment slurries.

Suitch et al also disclose a process for the formation of hydrous kaolin aggregates in U.S. Pat. No. 5,068,276. In this invention a fine hydrous kaolin feed material, with at least 60% by weight of particles freer than 0.25 microns, is dispersed at 25% solids and cross-linked with a calcium polyacrylate "adhesive". The mixture is stirred for 30 minutes, pH neutralized with ammonia and stirred for a further 10 minutes before spray drying to "fix" or cure the adhesive. Fine calcium carbonate particles may be incorporated into the structure to add brightness to the final product. This process, produces a "bulked" kaolin product, but is complex to operate and involves drying of the final product prior to use as a paper filling pigment or a coating pigment.

Beazley, in TAPPI monograph CA57, "Retention of Fine Solids During Papermaking", Chapter 9, pp 99–113, describes the two basic mechanisms that control retention of a filler in a paper web. These mechanisms are filtration retention and adsorption retention. In FIG. 1 it can be seen that as filler particle size increases, filtration retention increases and reaches a maximum value, with small or colloidal particles not well retained in the fiber web. Total retention increases as mean particle size increases until the adsorption component, which decreases with increasing particle size, reduces total retention. Highly anionic slurries of ground calcium carbonate particles or anionically dispersed slurries of aluminosilicate pigments, composed of a broad range of particle sizes would not be expected to be retained well in a paper web by either a drainage mechanism or an adsorption mechanism to negatively charged wood fibers.

In an attempt to improve the retention of mineral fillers via. an electrostatic attraction mechanism between the filler and the negatively charged fiber, cationic dispersion of minerals has been developed. Linden et al in U.S. Pat. Nos. 4,167,420 and 4,167,421 describe a range of cationic treatments for the dispersion of inorganic and organic pigments. U.K. Pat. App. No. 2,125,838 A describes a method for improving the retention of mineral fillers by producing a cationic surface charge with an organic polymer or inorganic salt that has been dried onto the surface of the particles. These processes are expensive and do not significantly improve the opacity or the bulk of the sheet of paper. Furthermore, when cationic fillers are employed, over cationization of the pulp prior to sheet formation can result in the drainage of the fiber web being significantly retarded.

Matthews et al in U.S. Pat. No. 4,610,801 describe a method for producing a cationic mineral slurry that is useful in the papermaking process. The methodology requires mixing combinations of cationic components and other additives such as the mineral hectorite or dispersing agents under high shear at high solids (greater than 30% w/w). The treated mineral slurry is better retained in a paper web than a control slurry that has not been treated.

In a different approach to improving retention, Davidson in U.S. Pat. No. 4,115,187 describes the agglomeration of a calcium carbonate filler to produce acid resistant particles that are useful for paper filing at low pH values. Calcium carbonate slurries of at least 30% solids are non-selectively flocculated with high molecular weight hydrophilic polymer, which is rendered water-insoluble by a chemical insolubilizing agent. The agglomerated mineral particles are then incorporated into a paper web.

In U.S. Pat. No. 4,732,748 Stewart et al describe how a ground calcium carbonate pigment may be produced which has enhanced opacifying power and retention in a paper web relative to a conventional anionically dispersed ground calcium carbonate filler pigment slurry. The process requires grinding the mineral in the absence of a dispersant and classifying out the fine particles, which are rejected, lowering the yield of the product from the feed material. The dispersant free, fines deficient, product has to be transported to the paper mill as a dry powder and slurried on site, or must be shipped as a low solids slurry. Both approaches increase the cost of the pigment and make it uneconomic relative to scalenohedral precipitated calcium carbonate. The preferred embodiment of Stewart would not be expected to provide bulk to a filled sheet of paper.

Gill et al in U.S. Pat. No. 4,892,590 disclose the treatment of a fine or colloidal precipitated calcium carbonate pigment suspension with a cationic potato starch to improve filler retention as well as paper web opacity and strength. Cationic potato starch is the preferred "fixing" agent for the highly anionically surface charged precipitated calcium carbonate particles. As will be disclosed in the present invention, such a high molecular weight cationic polyelectrolyte is not preferred because selective aggregation of the fines present in the mineral slurry will not take place. The invention of Gill et al would not be expected to enhance the bulk of the paper web. Furthermore, Gill et al require some 1,000 lbs to 40,000 lbs of cationic starch per. ton of precipitated calcium carbonate to enhance the retention of the anionically surface charged filler calcium carbonate particles.

Mineral pigments such as kaolin, calcium carbonate, talc and titanium dioxide are also well known in the coating of paper and paper board. Aqueous slurries of mixtures of some or all of these mineral types are applied to the paper or paper board surface as a "coating color" which, when dried, provides improved surface properties to the paper article such as enhanced smoothness and gloss. Present day coatings are applied at high machine speeds that necessitate rapid drying of the applied coating color, as such the mineral dispersion should preferably possess good high shear rheological properties.

The properties which render a mineral, or pigment, of value as a coating pigment are well known. These include low abrasion, as well as high brightness and opacifying characteristics. The low abrasion is significant in order to assure that the resultant paper product can be manufactured and converted easily with conventional machinery. The brightness and opacifying characteristics are important in producing an acceptable sheet of paper, or board, one which incorporates whiteness, high opacity, and an optimum bulk/weight ratio.

The brightness and opacifying characteristics of a pigment when coated on a sheet of paper, may also be quantitatively related to a property of the pigment identified as the "scattering coefficient, S". The scattering coefficient, S, of a given pigment is a property well known and extensively utilized in paper coating and has been the subject of many technical papers.

Titanium dioxide, with a blocky or rhombohedral particle morphology is amenable to high solids slurries, but is very expensive, as such its use is restricted to that of a minor component or additive in coating colors. Titanium dioxide, can be incorporated into the paper coating formulation in the form of anatase or rutile and has a higher refractive index than other naturally occurring minerals. It is also very abrasive thus despite its effectiveness as an opacifying pigment, its use is limited and cheaper more satisfactory replacements are much sought after.

Aluminosilicate pigments such as kaolin and talc have a platy morphology which restricts their use in high solids coatings. The platy nature of these pigments does however enhance the gloss of a sheet of paper at relatively low coat weights, which is important for lighter grades of paper that have to be shipped by mail. Platy pigments also "cover" the fiber web well, bridging gaps between the fibers and providing a coherent coating at low coat weights.

The porous nature of calcined clays results in mineral slurries that are dilatent at high solids contents, typical paper filling grade calcined clays must be transported to a paper mill at approximately 50% solids in water, or shipped as dry powder and slurried on-site at the mill. Paper coating grades of calcined clays can be transported at 60% solids.

Pratt et al in U.S. Pat. No. 4,738,726, as discussed above, has a high shear rheology that would be expected to be poor because of the combination of a platy pigment morphology and a fines deficient particle size distribution. This would limit the attainable solids of a coating color and increase the drying demand on the paper coating machine.

SUMMARY OF THE INVENTION

An aspect of the present invention is a process for the selective aggregation of the fine particles present in an anionically or cationically dispersed naturally ground or synthetically precipitated calcium, magnesium or aluminum containing mineral pigment slurry, such that an aggregated structure is formed which contains within it a labyrinth of internal voids or pores, which collectively function as light scattering centers. The aggregates are formed from an assemblage of fine or colloidal mineral particles, interconnected or bonded together with small quantities of a cationic or anionic polymer or agent of low molecular weight.

Pursuant to such a process, an aqueous slurry of anionically or cationically dispersed mineral particles is formed at 1 to 30% solids, from a feed material selected from one or more members of the group consisting of naturally ground or synthetically precipitated calcium carbonate, calcium hydroxide, magnesium carbonate, magnesium hydroxide, aluminum hydroxide or calcium sulfate. A low molecular weight cationic or anionic polymer or agent is then added to the slurry of mineral particles to selectively aggregate the fine particles present in the feed material. The resultant aggregates are of larger mean particle size than the feed mineral slurry and contain little or no fine or colloidal particles free in suspension. The net charge present on the aggregated particles is lower than that of the feed material. These mineral aggregates are then of a suitable size and surface charge to be retained well in a fiber web by a combination of filtration retention and adsorption retention, and provide added bulk and opacity to the finished sheet of paper.

Another aspect of the present invention is a process for the selective aggregation of the fine and ultra-fine or colloidal particles present in an anionically dispersed hydrous kaolin clay mineral pigment slurry, such that an aggregated structure is formed which contains within it a labyrinth of internal voids or pores, which collectively function as light scattering centers. The aggregates are formed from an assemblage of fine and ultra-fine or colloidal mineral particles, interconnected or bonded together with a small quantity of a cationic polymer or agent of low molecular weight.

Pursuant to such a process, an aqueous slurry of anionically dispersed kaolin, talc or aluminium trihydrate particles is formed at 1 to 30% solids. A low molecular weight cationic polymer or agent is then added to the slurry of mineral particles to selectively aggregate the fine and ultra-fine or colloidal particles present in the feed material. The resultant aggregates are of larger mean particle size than the feed material and contain little or no fine and ultrafine or colloidal particles. The net charge present on the aggregated particles is lower than that of the feed material. These mineral aggregates are then of a suitable size and surface charge to be retained well in a fiber web by a combination of filtration retention and adsorption retention, and provide added bulk and opacity to the finished sheet of paper.

Low fiber solids (typically much less than 1%) are used in the papermaking process to aid good formation of the paper web. One of the many advantages of this invention is that there is no need to concentrate the selectively aggregated products of this invention prior to use as paper filling pigments. The products of this invention can be cost effectively manufactured on-site at the paper mill from a high solids, dispersed, mineral slurry and added or metered directly to the fiber furnish without further modification.

The selective aggregation of the fine and ultra-fine components present in a dispersed suspension of mineral particles, which is described in this invention, is believed to be entropy driven, with the larger surface free energy of the smaller particles dictating that they react preferentially. This process is analogous to Ostwald ripening during crystallization processes, which results in the selective dissolution of fine particles and the formation of a smaller number of larger particles.

The present invention most effectively uses all of the particles present in a high solids dispersed mineral slurry, such that the bulk of the sheet of paper and its opacity are significantly enhanced. The combination of low specific surface area of the aggregated mineral pigments of this invention and low internal porosity provides maximum drainage to the fiber web with minimal impact on fiber to fiber bonding, or sheet strength. This combination of properties minimizes the drying demand of a paper machine while ensuring that high production rates can be maintained.

Another aspect of the present invention concerns a mineral slurry for coating paper or paper board. Fine particles present in an anionically dispersed ground calcium carbonate mineral pigment slurry are selectively aggregated, such that an aggregated structure is formed which contains within it a labyrinth of internal voids or pores, which collectively function as light scattering centers. The aggregates are formed from an assemblage of fine and colloidal mineral particles, interconnected or bonded together with a small quantity of a cationic polymer or agent of low molecular weight. (Although this discussion particularly describes naturally ground calcium carbonate, it should be understood that it will apply equally to mineral pigment slurries containing materials such as synthetically precipitated calcium, magnesium or aluminum.)

Pursuant to such a process, an aqueous slurry of anionically dispersed calcium carbonate particles is formed at 1 to 30% solids. A low molecular weight cationic polymer or agent is then added to the slurry of mineral particles to selectively aggregate the fine particles present in the feed material. The resultant aggregates are of larger mean particle size than the feed material and contain little or no fine or colloidal particles free in suspension. The net charge present on the aggregated particles is lower than that of the feed material. The low solids suspension of the aggregated mineral particles is then dewatered, or increased in solids, by one of a number of processes such as centrifugation, evaporation, filtration or reverse osmosis to form a slurry with a solids content greater than 60% by weight of aggregated mineral particles in water. Other such dewatering, or concentration techniques, known to those skilled in the art can also be used to increase the solids of the aggregated product of this invention.

This aspect of the present invention most effectively uses all of the particles present in a high solids dispersed mineral slurry, such that the bulk of the coating on a sheet of paper and its opacity are significantly enhanced. Such aggregated calcium carbonate mineral pigments would be expected to be retained on the surface of the sheet of paper or board after the coating process and not migrate, or wick down, into the fiber web.

The structured mineral pigments disclosed in this aspect of the invention are particularly useful for the pre-coating of paper and paper board products, light weight coating of paper products as well as the coating of recycled board and paper products where good fiber coverage is important. Use of these novel mineral pigments is not, however, restricted to these particular coating applications.

DESCRIPTION OF PREFERRED EMBODIMENTS

Figure 1:
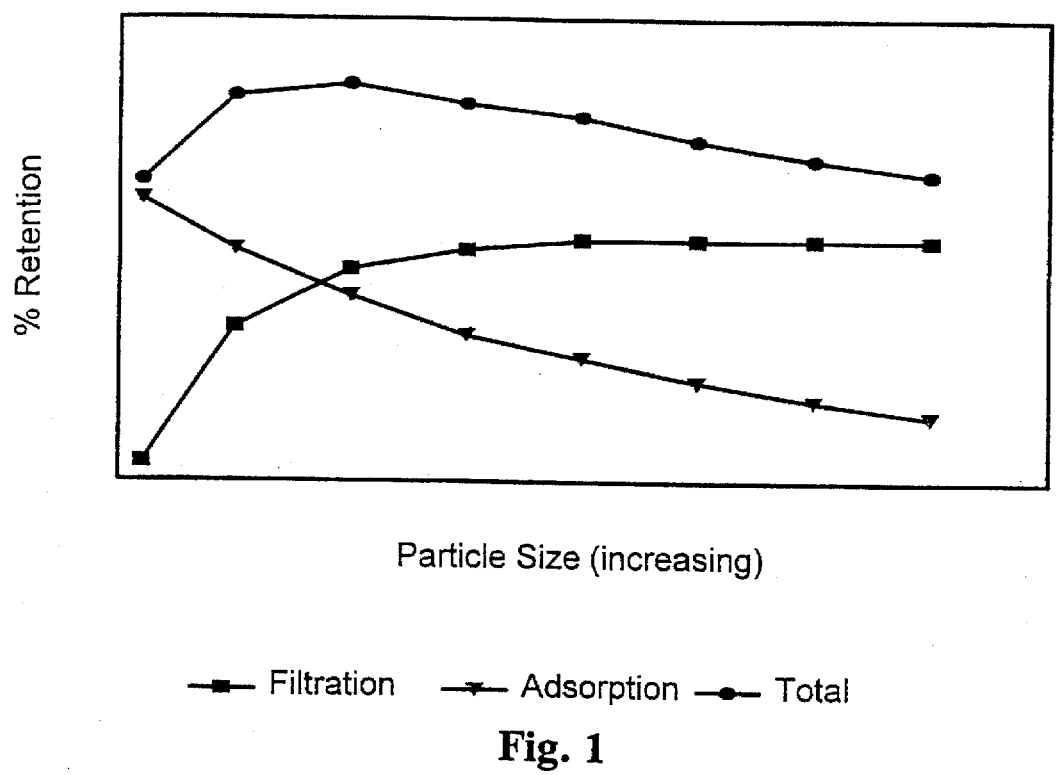
FIG. 1: Displays the impact of filler particle size on the two retention components; filtration and adsorption.

In one embodiment, the high solids anionically dispersed mineral slurry that is preferred as the feed material is selected from one or more members of the group consisting of naturally ground or synthetically precipitated calcium carbonate, calcium hydroxide, magnesium carbonate, magnesium hydroxide, calcium sulfate or aluminum hydroxide. Slurries of these minerals can be shipped to a paper mill at high solids, providing economic supply of the mineral feed material used in this invention. The high solids mineral slurry is preferably anionically dispersed with a polymer or copolymer of acrylic acid, methacrylic acid or any carboxylic acid or sulfonic acid containing vinyl monomer as described by Brown et al in U.S. Pat. No. 5,317,053. The high solids mineral feed slurry that is preferred in this invention can alternatively be cationically dispersed with any one or more of the cationic polymeric electrolytes described below.

Lower solids slurries of synthetically precipitated calcium carbonates, which have been produced on-site at a paper mill, or a central production facility and transported to the paper mill, are also preferred feed materials in this invention. These lower solids mineral slurries may naturally carry a net negative surface charge, or may be dispersed with an anionic polyelectrolyte dispersant as per. Brown et al in U.S. Pat. No. 5,317,053 to facilitate transportation, or one or more of the cationic polyelectrolytes described below.

A preferred feed mineral slurry consisting of a dispersion of naturally ground mineral particles typically has a range of particles of differing sizes and contains preferably no less than 30% by weight of particles finer than an equivalent spherical diameter of two microns. The fine fraction of the feed mineral slurry is defined as that component of the particles with an equivalent spherical diameter less than 0.5 microns, and the ultra-fine or colloidal fraction is defined as that component of the particles with an equivalent spherical diameter less than 0.2 microns. Typically, a feed material with 60% by weight of particles finer than two microns will have of the order of 15% by weight of particles in the fines range, and a feed material with 90% by weight of particles finer than two microns will have of the order of 40% by weight of particles in the fines range. The absolute value of the fines content of a given feed mineral slurry will necessarily depend upon the method of production and the mean particle size of the feed mineral slurry in microns.

A preferred synthetic or precipitated feed mineral slurry is that containing "prismatic", rhombohedral, clustered prismatic or scalenohedral particles whereby no less than 30% by weight of the particles are finer than an equivalent spherical diameter of two microns. The fines content of these synthetically produced feed mineral slurries will depend upon the mean particle size of the product and can consist of greater than 10% by weight of particles smaller than an equivalent spherical diameter of 0.5 microns. Indeed, some fine synthetic rhombohedral precipitated calcium carbonate products can contain up to 80% of fines as described by Passaretti et al, TAPPI Journal, Vol 76, No. 12, 135–140, 1993.

As part of the treatment process disclosed in this invention, the aqueous mineral slurry is diluted with water to a solids range between 0.1 and 30% by weight. Best results are achieved at a solids range between 1 and 20% by weight, about 10% being most preferred.

Dilution of the aqueous mineral slurry to about 10% by weight solids or less is essential in order that the fine particles, which possess most of the available surface area, can be selectively aggregated when the low molecular weight cationic or anionic agent is added to the mineral slurry. A cationic or anionic agent, selected to have a charge opposite that of the mineral particles in the dilute slurry, is added in an amount sufficient to cause fines to agglomerate. A combination of plural cationic agents or a combination of plural anionic agents can be used where appropriate. Best operation occurs with the addition of 1 to 15 lbs. of ionic agent per ton of mineral solids, although higher amounts can be used without detrimental effects. Full agglomeration typically requires the addition of at least 4 lbs./ton.

Water soluble polymeric cationic polyelectrolytes are well known in the art. Generally such materials do not contain negative groups such as carboxyl or carbonyl groups. In addition to alkyl diallyl quaternary ammonium salts, other quaternary ammonium cationic polymers are obtained by copolymerizing aliphatic secondary amines with epichlorohydrin (see U.S. Pat No. 4,174,279). Still other water soluble cationic polyelectrolytes are poly (quaternary ammonium) polyester salts that contain quaternary nitrogen in a polymeric backbone and are chain extended by ether groups. They are prepared from water soluble poly (quaternary ammonium salts) containing pendant hydroxyl groups and bifunctionally reactive chain extending agents; such polyelectrolytes are prepared by treating an N, N, $N^{(1)}$, $N^{(1)}$ tetralkylhydroxyalkenediamine and an organic dihalide such as dihydroalkane or a dihaloether with an epoxy haloalkane (see U.S. Pat. No. 3,633,461).

Other water-soluble cationic polyelectrolytes are polyamines which are usually supplied under commercial trade designations. Copolymers of acrylamide with cationic vinyl monomers or low molecular weight polyethyleneimine polyelectrolytes could also be used in this invention.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000 has been found to be particularly useful in this embodiment of the present invention. However, the invention is not limited to Agefloc WT50 SLV since other cationic polyelectrolytes appear to provide equivalent, if not superior results. Other cationic polyelectrolytes available from the CPS chemical Company that have been shown to be useful in this embodiment of the present invention are; Agefloc WT 40 which has a molecular weight estimated to range from 200,000 to 400,000; Agefloc C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

"Low molecular weight" as used in this disclosure refers to molecular weights no greater than 1,000,000. Cationic potato starch is reported as having an estimated molecular weight of 1,000,000 to 3,500,000, while corn starch is reported as having a molecular weight ranging from 800,000 to 1,800,000, see Scott, "Wet End Chemistry", TAPPI Press, 1992. Such high molecular weight cationic polyelectrolytes are not preferred in the present invention. However, cationic starches, cationic guar gum, or other modified polysaccharides could also act as preferred aggregating agents in this invention if they were of sufficiently low molecular weight.

Also preferred as cationic agents in this embodiment are salts of divalent and trivalent metal ions such as calcium and aluminum. Examples of such salts include, but are not restricted to: aluminum sulphate (papermakers alum), sodium aluminate, polyaluminum chloride (PAC) and calcium chloride.

The filler material of this embodiment is most advantageously produced, from raw ingredients, at the site of the mill where the material will be used. This avoids the expense of shipping a dilute slurry. The ionic agent is added to agglomerate the fines before the filler is combined with cellulosic material. The filler material is used in the fashion of prior filler materials. For example, a filler material according to this embodiment of the present invention can be fed to a paper making machine in the manner of a standard paper-making filler slurry.

In another embodiment, the anionically dispersed mineral slurry that is preferred as the feed material is selected from one or more members of the group consisting of kaolin, talc or aluminum trihydrate. Slurries of these minerals can be shipped to a paper mill at high solids, providing economic supply of the mineral feed material used in this invention. The high solids mineral slurry is preferably anionically dispersed with a polymer or copolymer of acrylic acid, methacrylic acid or any carboxylic acid or sulfonic acid containing vinyl monomer. Tetrasodium pyrophosphate, other polyphosphate materials, and sodium silicate, which are known to those skilled in the art of mineral dispersion technology, are also preferred dispersants.

A preferred feed mineral slurry consisting of a dispersion of kaolin typically has a range of particles of differing sizes and contains preferably no less than 30% by weight of particles finer than an equivalent spherical diameter of two microns. The free fraction of the feed mineral slurry is defined as that component of the particles with an equivalent spherical diameter less than 0.5 microns, and the ultra-fine or colloidal fraction is defined as that component with an equivalent spherical diameter less than 0.2 microns. Typically a feed material with 90% by weight of particles finer than two microns will have of the order of 65% by weight of particles in the free range. The absolute value of the fines content of a given feed mineral slurry will necessarily depend upon the geographic source of the mineral feed, method of production, and the mean particle size of the mineral slurry in microns.

As part of the treatment process disclosed in this invention, the aqueous mineral slurry is diluted with water to a solids range between 0.1 and 30% by weight. Best results are achieved at a solids range between 1 and 20% by weight, about 10% being most preferred.

Dilution of the aqueous kaolin slurry to about 10% by weight solids or less is essential in order that the fine and ultra-fine particles, which possess most of the available surface area, can be selectively aggregated when the low molecular weight cationic agent is added to the mineral slurry. A cationic agent is added in an amount sufficient to cause fines to agglomerate. A combination of plural cationic agents can be used where appropriate. Best operation occurs with the addition of 3 to 30 lbs. of ionic agent per ton of mineral solids, although higher amounts can be used without detrimental effects. Full agglomeration typically requires the addition of at least 4 lbs./ton.

Water soluble polymeric cationic polyelectrolytes are well known in the art. Generally such materials do not contain negative groups such a carboxyl or carbonyl groups. In addition to alkyl diallyl quaternary ammonium salts, other quaternary ammonium cationic polyelectrolytes are obtained by copolymerizing aliphatic secondary amines with epichlorohydrin (see U.S. Pat No. 4,174,279). Still other water soluble cationic polyelectrolytes are poly (quaternary ammonium) polyester salts that contain quaternary nitrogen in a polymeric backbone and are chain extended by ether groups. They are prepared from water soluble poly (quaternary ammonium salts) containing pendant hydroxyl groups and bifunctionally reactive chain extending agents; such polyelectrolytes are prepared by treating an N, N, $N^{(1)}$, $N^{(1)}$ tetralkylhydroxyalkenediamine and an organic dihalide such as dihydroalkane or a dihaloether with an epoxy haloalkane (see U.S. Pat. No. 3,633,461).

Other water-soluble cationic polyelectrolytes are polyamines which are usually supplied under commercial trade designations. Copolymers of acrylamide with cationic vinyl monomers or low molecular weight polyethyleneimine polyelectrolytes could also be used in this invention.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000 has been found to be particularly useful in this embodiment of the present invention. However, the invention is not limited to Agefloc WT50 SLV since other cationic polyelectrolytes appear to provide equivalent, if not superior results. Other cationic polyelectrolytes available from the CPS chemical Company that have been shown to be useful in this embodiment of the present invention are; Agefloc WT 40 which has a molecular weight estimated to range from 200,000 to 400,000; Agefloc C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

Also preferred as cationic agents in this embodiment of the present invention are salts of divalent and trivalent metal ions such as calcium and aluminum. Examples of such salts include, but are not restricted to: aluminum sulphate (papermakers alum), sodium aluminate, polyaluminum chloride (PAC) and calcium chloride.

The filler material of this embodiment is most advantageously produced, from raw ingredients, at the site of the mill where the material will be used. This avoids the expense of shipping a dilute slurry. The ionic agent is added to agglomerate the fines before the filler is combined with cellulosic material. The filler material is used in the fashion of prior filler materials. For example, a filler material according to this embodiment of the present invention can be fed to a paper making machine in the manner of a standard paper-making filler slurry.

In yet another embodiment a process for yielding a mineral slurry for coating paper or paper board is provided. In this embodiment, a high solids mineral slurry that is the preferred feed material is a fine ground calcium carbonate slurry that is anionically dispersed with a polymer or copolymer of acrylic acid, methacrylic acid or any carboxylic acid or sulfonic acid containing vinyl monomer as described by Brown et al in U.S. Pat. No. 5,317,053.

The preferred feed mineral slurry consists of a dispersion of naturally ground mineral particles typically with a range of particles of differing sizes and contains preferably no less than 30% by weight of particles finer than an equivalent spherical diameter of two microns. The fine fraction of the feed mineral slurry is defined as that component of the particles with an equivalent spherical diameter less than 0.5 microns, and the ultra-fine or colloidal fraction as that component of the particles with an equivalent spherical diameter less than 0.2 microns. Typically, a feed material with 60% by weight of particles finer than two microns will have of the order of 15% by weight of particles in the fines range, and a feed material with 90% by weight of particles finer than two microns will have of the order of 40% by weight of particles in the fines range. The absolute value of the fines content of a given feed mineral slurry will necessarily depend upon the method of production and the mean particle size of the feed mineral slurry in microns.

As part of the treatment process disclosed in this invention, the aqueous mineral slurry is diluted with water to a solids range between 0.1 and 30% by weight. Best results are achieved at a solids range between 1 and 20% by weight, about 10% being most preferred.

Dilution of the aqueous mineral slurry to about 10% by weight solids or less is essential in order that the fine particles, which possess most of the available surface area, can be selectively aggregated when the low molecular weight cationic agent is added to the mineral slurry. A cationic or anionic agent, selected to have a charge opposite that of the mineral particles in the dilute slurry, is added in an amount sufficient to cause fines to agglomerate. A combination of plural cationic agents or a combination of plural anionic agents can be used where appropriate. Best operation occurs with the addition of 1 to 15 lbs. of ionic agent per ton of mineral solids, although higher amounts can be used without detrimental effects. Full agglomeration typically requires the addition of at least 4 lbs./ton.

Water soluble polymeric cationic polyelectrolytes are well known in the art. Generally such materials do not contain negative groups such as carboxyl or carbonyl groups. In addition to alkyl diallyl quaternary ammonium salts, other quaternary ammonium cationic polymers are obtained by copolymerizing aliphatic secondary amines with epichlorohydrin (see U.S. Pat No. 4,174,279). Still other water soluble cationic polyelectrolytes are poly (quaternary ammonium) polyester salts that contain quaternary nitrogen in a polymeric backbone and are chain extended by ether groups. They are prepared from water soluble poly (quaternary ammonium salts) containing pendant hydroxyl groups and bifunctionally reactive chain extending agents; such polyelectrolytes are prepared by treating an N, N, $N^{(1)}$, $N^{(1)}$ tetralkylhydroxyalkenediamine and an organic dihalide such as dihydroalkane or a dihaloether with an epoxy haloalkane (see U.S. Pat. No. 3,633,461). Other water-soluble cationic polyelectrolytes are polyamines which are usually supplied under commercial trade designations. Copolymers of acrylamide with cationic vinyl monomers or low molecular weight polyethyleneimine polyelectrolytes could also be used in this invention.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000 has been found to be particularly useful in this embodiment of the present invention. However, the invention is not limited to Agefloc WT50 SLV since other cationic polyelectrolytes appear to provide equivalent, if not superior results. Other cationic polyelectrolytes available from the CPS chemical Company that have been shown to be useful in this embodiment of the present invention are; Agefloc WT 40 which has a molecular weight estimated to range from 200,000 to 400,000; Agefloc C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

Also preferred as cationic agents in this embodiment are salts of divalent and trivalent metal ions such as calcium and aluminum. Examples such salts include, but are not restricted to: aluminum sulphate (papermakers alum), sodium aluminate, polyaluminum chloride (PAC) and calcium chloride.

The coating material of this embodiment is most advantageously produced, from raw ingredients, at a central location and then transported to mills where the material will be used. The ionic agent is added to agglomerate the fines before the material is coated on a cellulosic web. The coating material of the present invention is used in the fashion of prior coatings. For example, a coating material according to the present invention can be fed to a paper making machine and applied in the manner of a standard paper-making coating slurry.

EXAMPLES

The invention is further illustrated by the following examples, which are to be considered illustrative and not delimitive of the invention otherwise set forth. In the following examples the components were selected from the following materials:

Feed mineral slurries:
High solids fine ground calcium carbonate slurries, Microna 3, Microna S-80 B, Microna S-90 HB and Microna S-93 from Columbia River Carbonates; Windsor, an air floated clay from Kentucky-Tennessee Clay Company.

Precipitated calcium carbonate slurries:
Albacar LO, a coarse particle size scalenohedral morphology pigment; Albacar HO, a fine particle size scalenohedral morphology pigment; Albafil a fine particle size rhombohedral morphology pigment and SX 1000, a course clustered prismatic morphology pigment produced by Specialty Minerals, Inc.

Cationic polyelectrolytes:
Dimethyldiallylammonium chloride homopolymer cationic polyelectrolytes Agefloc WT50 SLV, Agefloc WT40, dimethlydiallylammonium chloride copolymer Agefloc C1405, and dimethylamine/epichlorohydrin copolymers Agefloc B50, Agefloc A50 LV from the CPS Chemical Company, Inc.

Anionic polyelectrolytes:
Acumer 9400, a polyacrylic acid homopolymer, available from Rohm & Hass Co, with a molecular weight between 1,000 and 10,000.

Cationic starch:
Cationic potato starch, Westcat E-F, from Western Polymer Corporation.

Laboratory Handsheets. Handsheets were made with a British sheet mould according to TAPPI procedure T 205 om-88. Handsheet samples were temperature and humidity conditioned according to TAPPI T 402 "Standard Conditioning and Testing Atmospheres for Paper, Board, Pulp Handsheets, and Related Products". All physical tests on the handsheet samples were carried out in accordance with TAPPI procedure T 220 "Physical Testing of Handsheets". Pulp drainage measurements were carried out in accordance with TAPPI procedure T221 "Drainage Time of Pulp". The data presented is interpolated data at 10, 15, 20 and 25% ash values. Ten separate handsheets were made and measured for each filler level according to TAPPI procedure T 205 om-88.

The following test equipment was used to evaluate the physical properties of the handsheets made in the examples below: Thwing-Albert Inst. Co., Model 323, Digital Opacimeter; Teledyne Corp., Techibrite Micro-TB-1C; Electronic Microgage, Emveco, 210-dh; Lorentzen and Wetre, Type 14-2 Burst-O-Matic.

EXAMPLE 1

A sample of dry, air classified, ground limestone (Microna 7) with a mean particle size of 7 microns was slurried in water at a solids of 40%. To this slurry was added 3 lbs/t of a cationic polyelectrolyte Agefloc A50 LV. The resultant mixture was ground in a laboratory Dyno-Mill, KDL Pilot media mill to a product with a mean particle size of 60% by weight of particles finer than 2 microns containing 11% by weight of particles finer than 0.5 microns. This cationically dispersed, fine ground calcium carbonate mineral slurry has a particle surface charge of +42.1 ueg/g, determined with a Mutek PCD 02 Particle Charge Detector and is designated as SF 1.

EXAMPLE 2

A sample of Microna S-90 HB, which is a commercially available, anionically dispersed, ground calcium carbonate pigment slurry containing 90% by weight of particles finer than 2 microns and 45% by weight of particles finer than 0.5 microns, was diluted to 10% solids by weight in water. To this feed mineral suspension was added, with stirring, a solution of 1.0% (weight/weight in water) cationic potato starch, Westcat E-F, with an estimated molecular weight of 3,000,000 to 3,500,000. Doze rates of 3 lbs/t and 6 lbs/t cationic starch to Microna S-90 HB (dry on dry) were added to the feed mineral slurry.

The particle surface charge of the anionically dispersed Microna S-90 HB feed mineral slurry was determined as −36.6 ueg/g. After treatment with 3 lbs/t of the cationic potato starch the mineral surface charge was reduced to −11.8 ueg/g, and after treatment with 6 lbs/t of the cationic potato starch the mineral surface charge was determined as −8.4 ueg/g.

Figure 2:
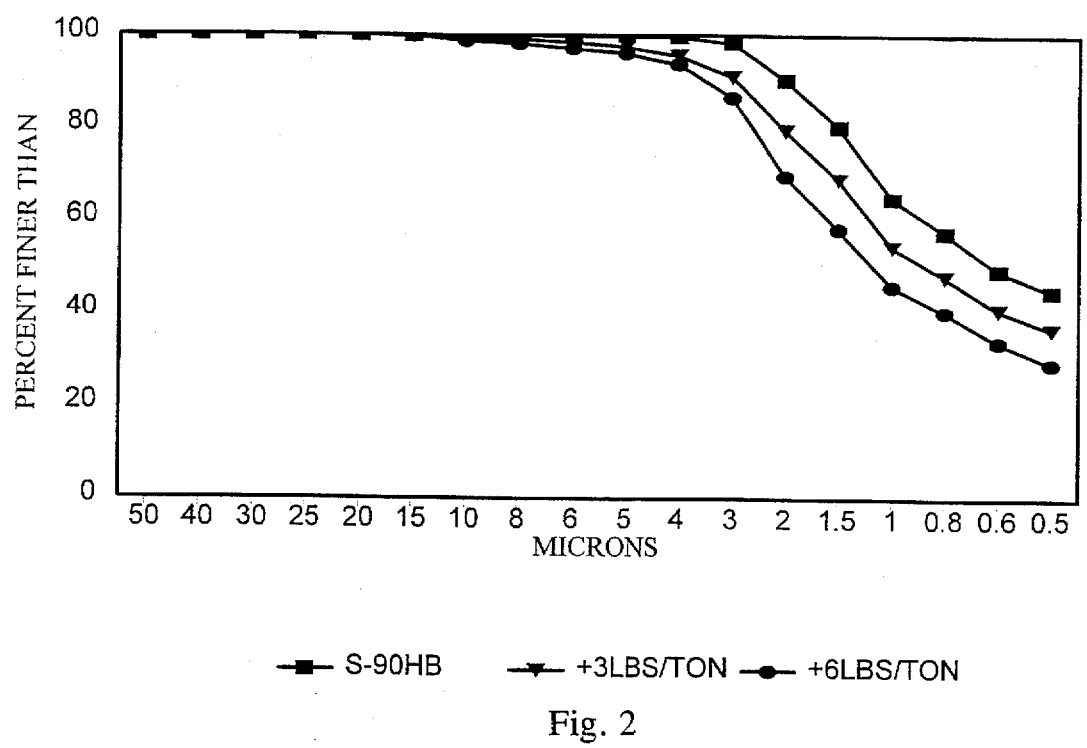
FIG. 2: Displays the effect of addition of 3 lbs/t and 6 lbs/t high molecular weight cationic starch on the particle size distribution curve of an anionically dispersed mineral slurry at 10% solids.

FIG. 2 shows the impact of the cationic starch treatment on the particle size distribution of Microna S-90 HB as determined by a Micromeritics "Sedigraph 5100" particle size analyzer. These data show that as the amount of cationic starch increases general flocculation of all of the particles present in the feed mineral slurry takes place, with the particle size curve simply displaced to a higher mean particle size at higher cationic starch doze rates. At 6 lbs/t cationic starch treatment level there are still some 30% by weight of particles finer than 0.5 microns present in the mineral slurry.

EXAMPLE 3

A sample of Microna S-80 B, which is a commercially available, anionically dispersed, ground calcium carbonate pigment slurry containing 80% by weight of particles finer than 2 microns and 40% by weight of particles finer than 0.5 microns, was diluted to a range of differing solids levels with water. To this feed mineral suspensions was added, with stirring, a solution of 1.0% (weight/weight in water) of the cationic polyelectrolyte Agefloc WT50 SLV which has an estimated molecular weight between 10,000 and 50,000. A doze rate of 5 lbs/t Agefloc WT50 SLV to Microna S-80 B (dry on dry) was used for all the treatment experiments.

Figure 3:
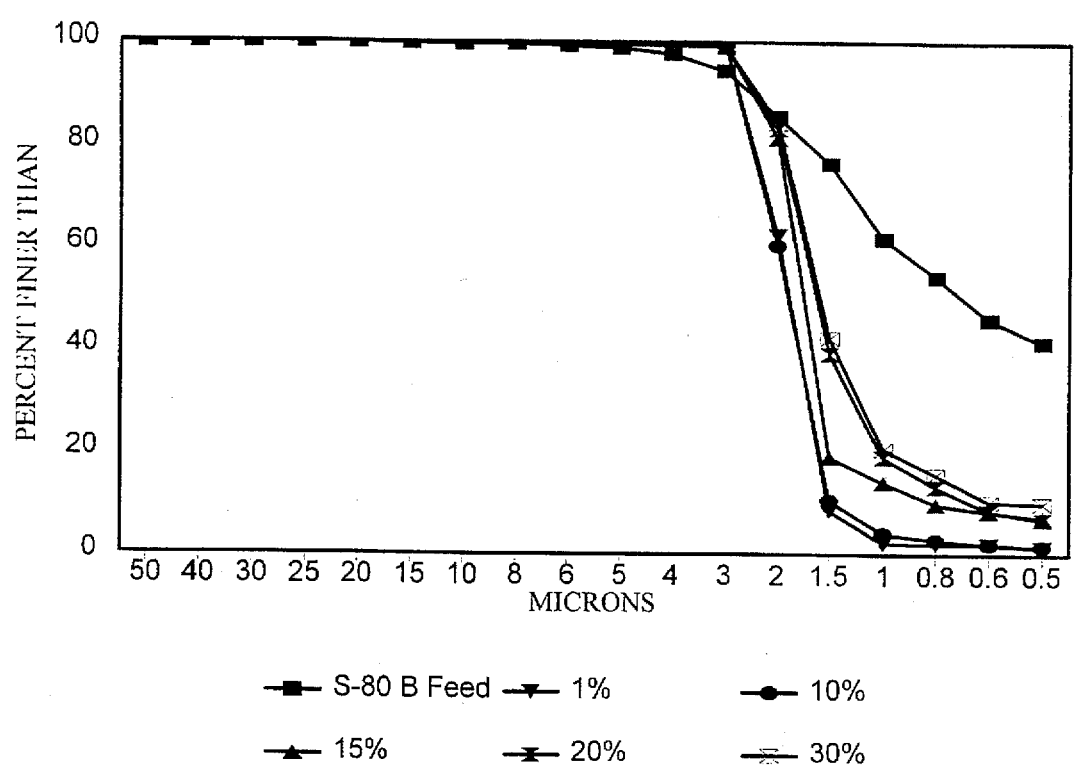
FIG. 3: Displays the effect of a 5 lbs/t addition of a low molecular weight cationic polyelectrolyte (Agefloc WT50 SLV) on the particle size distribution curve of an anionically dispersed mineral slurry at a range of treatment solids levels.

FIG. 3 shows the data from these experiments which clearly demonstrate that the addition of a low molecular weight cationic polyelectrolyte to the anionically surface charged and dispersed feed mineral slurry results in selective aggregation of the fine component of the feed material when the treatment is carried out at low solids. From these data it can be seen that if the mineral feed slurry is 10% solids or lower prior to treatment with the low molecular weight cationic polyelectrolyte, complete aggregation of the fines present in the feed mineral slurry takes place.

EXAMPLE 4

A sample of Microna S-90 HB, which is a commercially available, anionically dispersed, ground calcium carbonate pigment slurry containing 90% by weight of particles finer than 2 microns and 45% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. Doze rates of 1, 3 and 5 lbs/t Age floe WT50 SLV to Microna S-90 HB (dry on dry) were added to the feed mineral slurry.

The particle charge of the Microna S-90 HB feed mineral slurry was reduced from −36.6 ueg/g to −7.48 ueg/g with the addition of 5 lbs/t Agefloc WT50 SLV. The median particle diameter of the treated mineral slurry increased from a value of 0.58 microns for the feed material to 2.35 microns for the mineral slurry treated with 5 lbs/t of the cationic polyelectrolyte.

Figure 4:
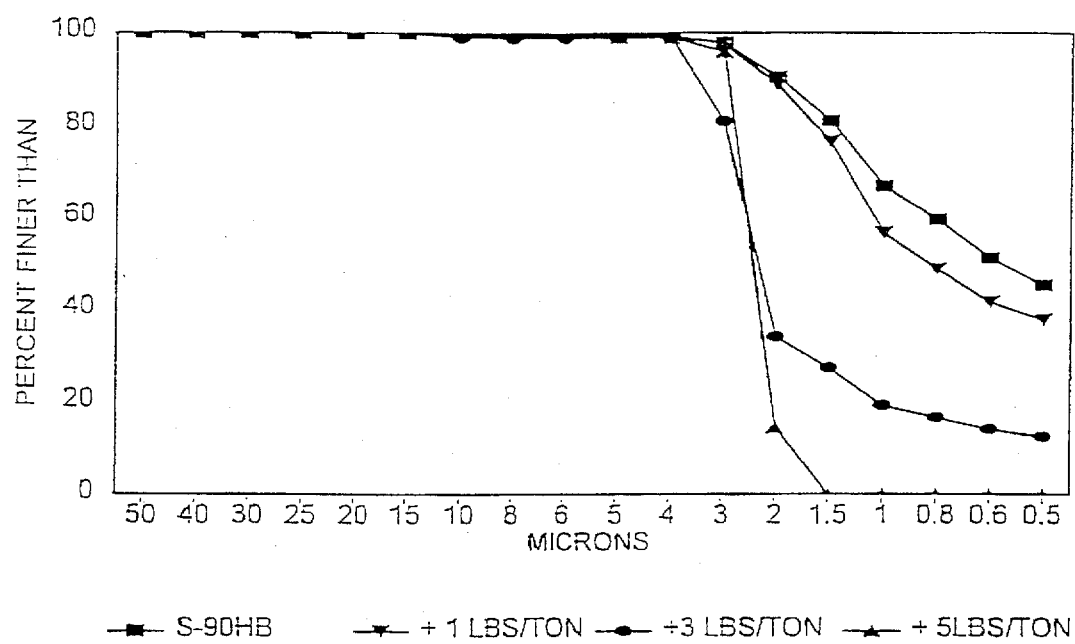
FIG. 4: Displays the effect of addition of increasing quantities of a low molecular weight cationic polyelectrolyte (Agefloc WT50 SLV) on the particle size distribution curve of an anionically dispersed mineral slurry at 10% solids.

FIG. 4 shows the particle size curve of Microna S-90 HB after treatment with various levels of Agefloc WT50 SLV. As can be seen, a 5 lbs/t treatment with the low molecular weight cationic polyelectrolyte selectively aggregates all of the free particles present in the feed mineral slurry.

EXAMPLE 5

A sample of Microna S-90 HB, which is a commercially available, anionically dispersed, ground calcium carbonate pigment slurry containing 90% by weight of particles finer than 2 microns and 45% by weight of particles finer than 0.5 microns, was diluted to 10% solids by weight in water. To this feed mineral suspension was added in separate experiments, with stirring, a solution of 1.0% (weight/weight in water) of the cationic polyelectrolytes Agefloc C1405, Agefloc B50, Agefloc WT40 and Agefloc A50 LV which have estimated molecular weights in the range 10,000 to 400,000 as outlined above. Doze rates of 5 lbs/t were used for all the individual cationic polyelectrolyte treatment experiments.

Figure 5:
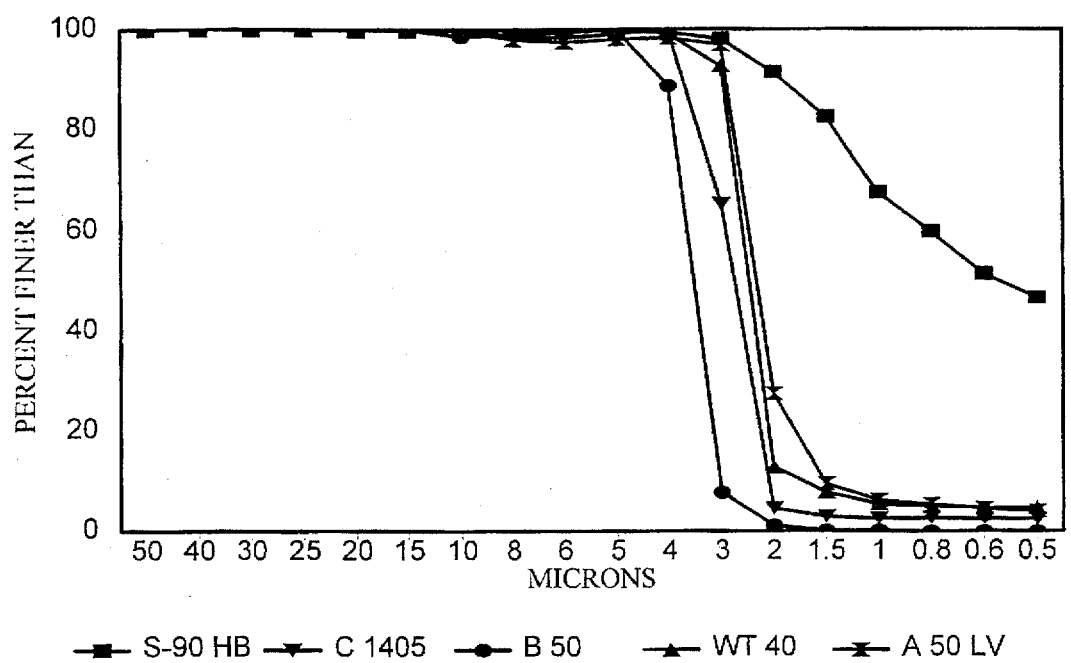
FIG. 5: Displays the effect of addition of a number of different low to medium molecular weight cationic polyelectrolytes, at 5 lbs/t doze rate, on the particle size distribution curve of an anionically dispersed mineral slurry at 10% solids.

FIG. 5 shows the impact of these cationic polyelectrolyte treatments on the particle size curve of Microna S-90 HB. From this figure it can be seen that all of the polymer treatments chosen selectively aggregate the fine component of the feed material. The mean particle size of the resultant products and surface charges are as follows:

| Polymer (5 lbs/t) | Mean particle size (microns) | Surface charge (ueg/g) |
| --- | --- | --- |
| None (feed) | 0.58 | −37.0 |
| Agequat C1405 | 2.82 | −10.6 |
| Agefloc B50 | 3.51 | −7.66 |
| Agefloc WT40 | 2.27 | −6.89 |
| Agefloc A50 LV | 2.28 | −8.00 |

EXAMPLE 6

A sample of Microna 3, which is a commercially available, air classified fine ground calcium carbonate pigment was slurried at 70% solids with an anionic dispersant, Acumer 9400. Microna 3 contains 35% by weight of particles finer than 2 microns and 10% by weight of particles finer than 0.5 microns, the feed mineral slurry was diluted to 10% solids by weight in water and to this mineral suspension was added, with stirring, a solution of 1.0% (weight/weight in water) of the cationic polyelectrolyte Agefloc WT50 SLV which has an estimated molecular weight between 10,000 and 50,000. Doze rates of 1, 3 and 5 lbs/t Agefloc WT50 SLV to Microna 3 (dry on dry) were added to the feed mineral slurry.

Figure 6:
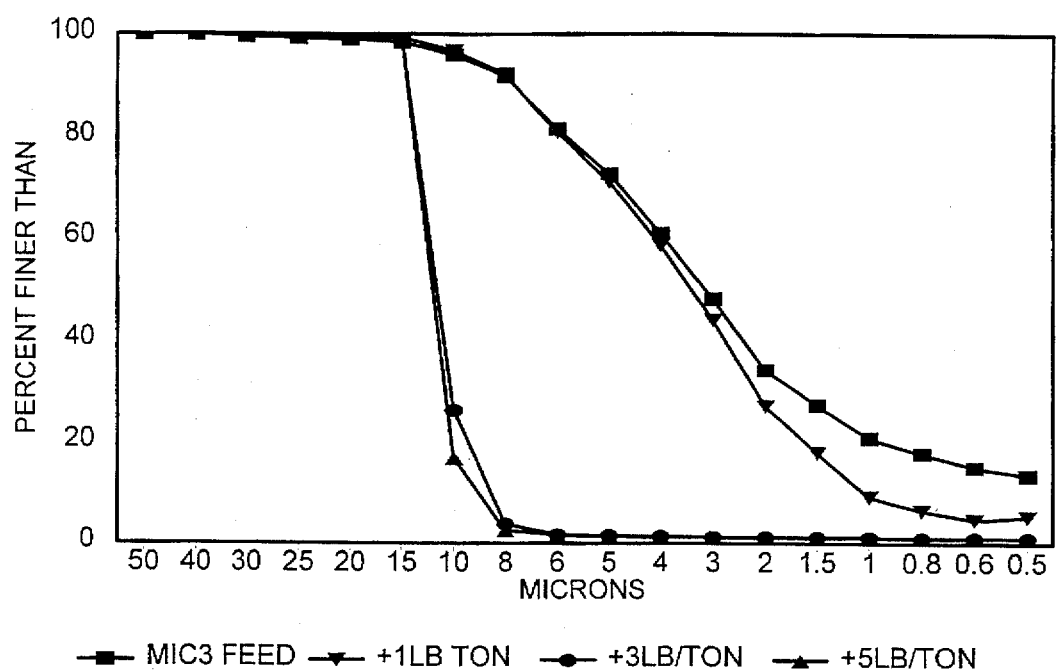
FIG. 6: Displays the effect of addition of increasing quantities of the low molecular weight cationic polyelectrolyte Agefloc WT50 SLV on the particle size distribution curve of an anionically dispersed slurry of Microna 3.

FIG. 6 displays the result of addition of the cationic polyelectrolyte on the anionically dispersed slurry of Microna 3. From these data it can be seen that addition of 3 lbs/t of the cationic polyelectrolyte Agefloc WT50 SLV aggregates the Microna 3 such that no fine particles remain free in the mineral suspension. The relatively coarse mean particle size of Microna 3, 3.14 microns, results in a relatively coarse aggregated product with a mean particle size of 11.7 microns. The charge of the product from this experiment was determined as −18 ueg/g, which is substantially lower than the feed mineral slurry (−30 ueg/g).

EXAMPLE 7

A sample of Microna S-80 B, which is a commercially available, anionically dispersed, ground calcium carbonate pigment slurry containing 80% by weight of particles finer than 2 microns and 40% by weight of particles finer than 0.5 microns, was diluted to a solids level of 10% with water. To this feed mineral suspensions was added, with stirring, a solution of 1.0% (weight/weight in water) of the cationic polyelectrolyte Agefloc WT50 SLV which has an estimated molecular weight between 10,000 and 50,000. Doze rates of 5, 7, 9, 11 and 13 lbs/t Agefloc WT50 SLV to Microna S-80 B (dry on dry) were used for the experiments.

Figure 7:
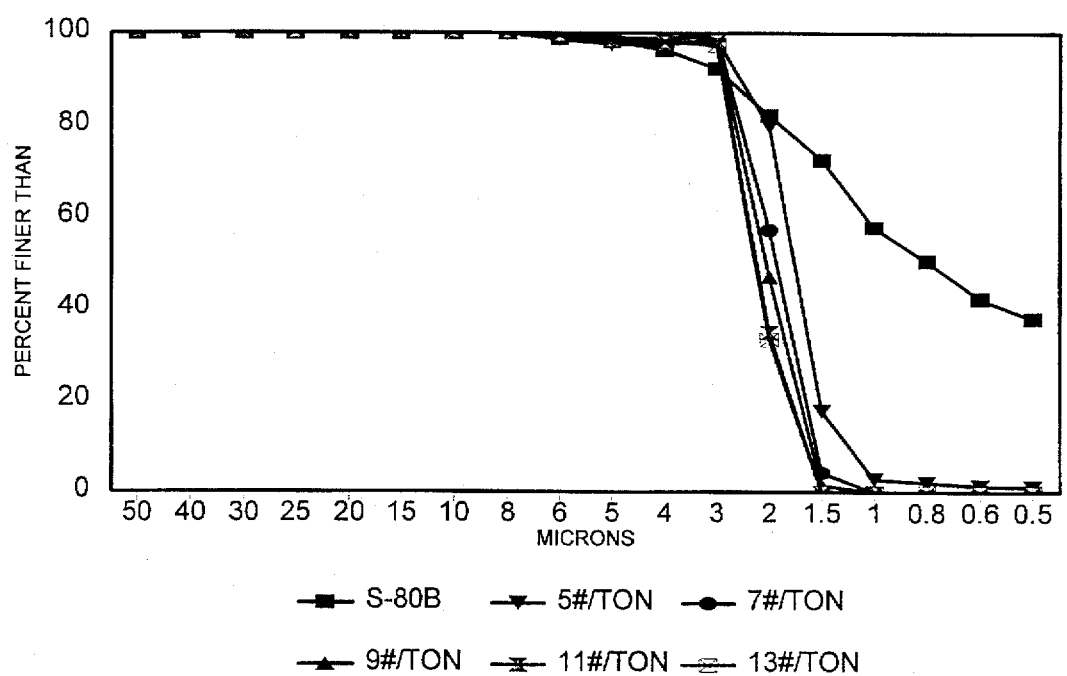
FIG. 7: Displays the effect of increasing the doze rate of Agefloc WT50 SLV on the particle size distribution curve of Microna S-80 B that has been treated at 10% solids.

FIG. 7 shows the data from these experiments which clearly demonstrate that the addition of a low molecular weight cationic polyelectrolyte to the anionically surface charged and dispersed feed pigment slurry results in selective aggregation of the fine component of the feed material when the treatment is carried out at low solids. Increasing the doze rate of the cationic polyelectrolyte above 5 lbs/t does not substantially change the mean particle size of the resultant aggregated product, but does further reduce the surface charge of the product as can be seen from the data in the table below:

| Polymer (lbs/t) | Mean particle size (microns) | Surface charge (ueg/g) |
|---|---|---|
| Feed S-80 B | 0.79 | −21.30 |
| 5 lbs/t WT50 SLV | 1.86 | −11.41 |
| 7 lbs/t WT50 SLV | 1.99 | −9.89 |
| 9 lbs/t WT50 SLV | 2.02 | −8.86 |
| 11 lbs/t WT50 SLV | 2.13 | −7.66 |
| 13 lbs/t WT50 SLV | 2.14 | −3.01 |

EXAMPLE 8

A large sample of Microna S-80 B was diluted to 10% solids and treated with 5 lbs/t of Agefloc WT50 SLV as in example 7 above. This sample will be referred to as SF 2 in subsequent examples.

Figure 8:
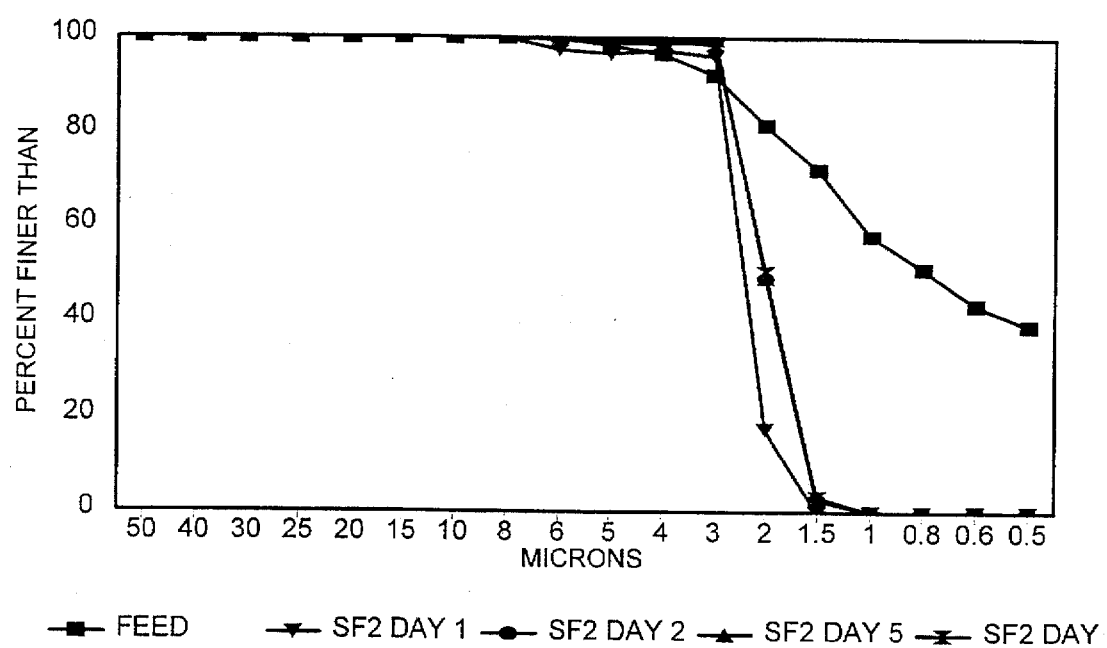
FIG. 8: Displays the effect of stirring on the particle size distribution curve of a suspension of SF 2 over a 6 day period.

A portion of SF 2 was stirred for a period of 6 days with a laboratory mixer. Aliquats of the product were tested for particle size distribution during that time period. FIG. 8 displays these data, and shows that once aggregation of the fine particles has taken place it is very difficult, if not impossible, to change the particle size distribution of the product. No fines were released or generated during the 6 day stirring period.

EXAMPLE 9

A large sample of Microna S-80 B was diluted to 10% solids and treated with 5 lbs/t of Agefloc B50 as in example 3 above. This sample will be referred to as SF 3 in subsequent examples. The mean particle size of this product was determined as 3.51 microns, the particle surface charge was −7.66 ueg/g.

EXAMPLE 10

A large sample of Microna S-80 B was diluted to 10% solids and treated with 13 lbs/t of Agefloc WT50 SLV as in example 3 above. This sample will be referred to as SF 4 in subsequent examples. The mean particle size of this product was determined as 2.14 microns, the particle surface charge was −3.01 ueg/g.

EXAMPLE 11

Figure 9:
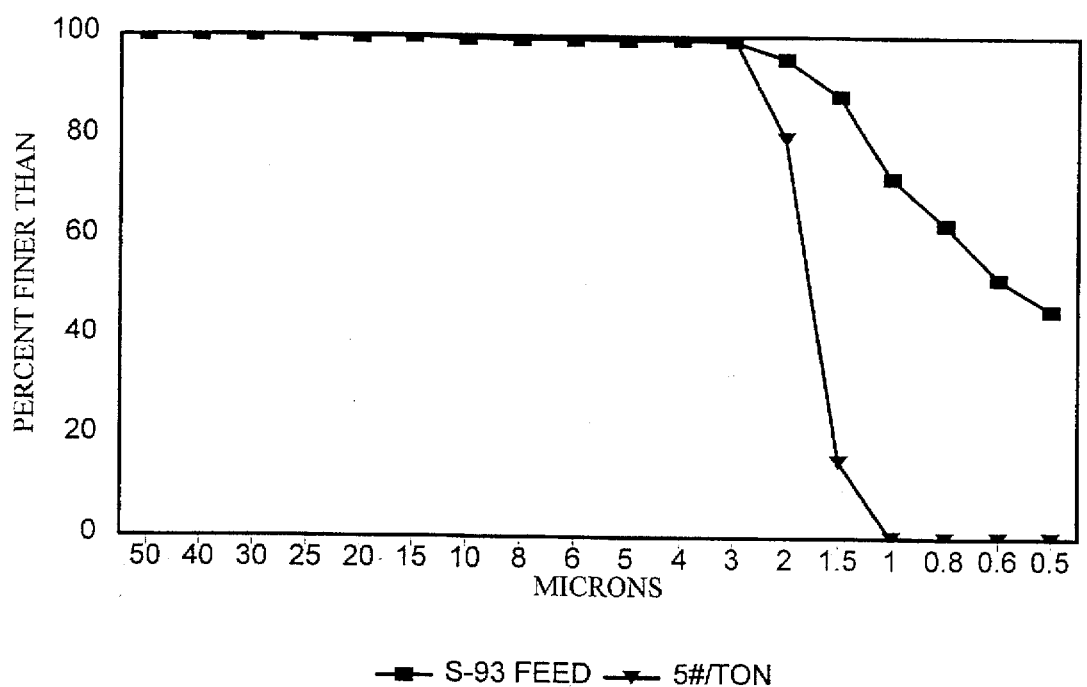
FIG. 9: Displays the effect of adding 5 lbs/t of the cationic polyelectrolyte Agefloc WT50 SLV to a 10% solids suspension of Microna S-93.

A large sample of Microna S-93, which is a commercially available, anionically dispersed, ground calcium carbonate pigment slurry containing 93% by weight of particles finer than 2 microns and 71% by weight of particles finer than 1 micron, was diluted to 10% solids and treated with a solution of 1.0% (weight/weight in water) of the cationic polyelectrolyte Agefloc WT50 SLV, at a doze rate of 5 lbs/t polymer to pigment. This sample will be referred to as SF 5 in subsequent examples. The mean particle size of this product was determined as 1.76 microns, and the particle surface charge was −20.46 ueg/g. FIG. 9 displays the impact of addition of the cationic polyelectrolyte on the particle size distribution of Microna S-93, no free particles are present in suspension after the treatment.

EXAMPLE 12

By way of comparing the present invention to currently available paper filler mineral pigments, a series of laboratory handsheets were made using a blend of 30% hardwood, 40% secondary fiber and 30% long fiber. The following polymer wet end additives were sequentially added to the fiber blend with mixing; 15 lbs/t of cationic potato starch, 1.5 lbs/t of ASA size and 0.4 lbs/t of an anionic retention aid. Final pulp consistency was 0.3%. To the furnish, with all of the additives present, was added varying amounts of the filler pigments Albacar LO, Microna S-80 B and SF 2.

Figure 10:
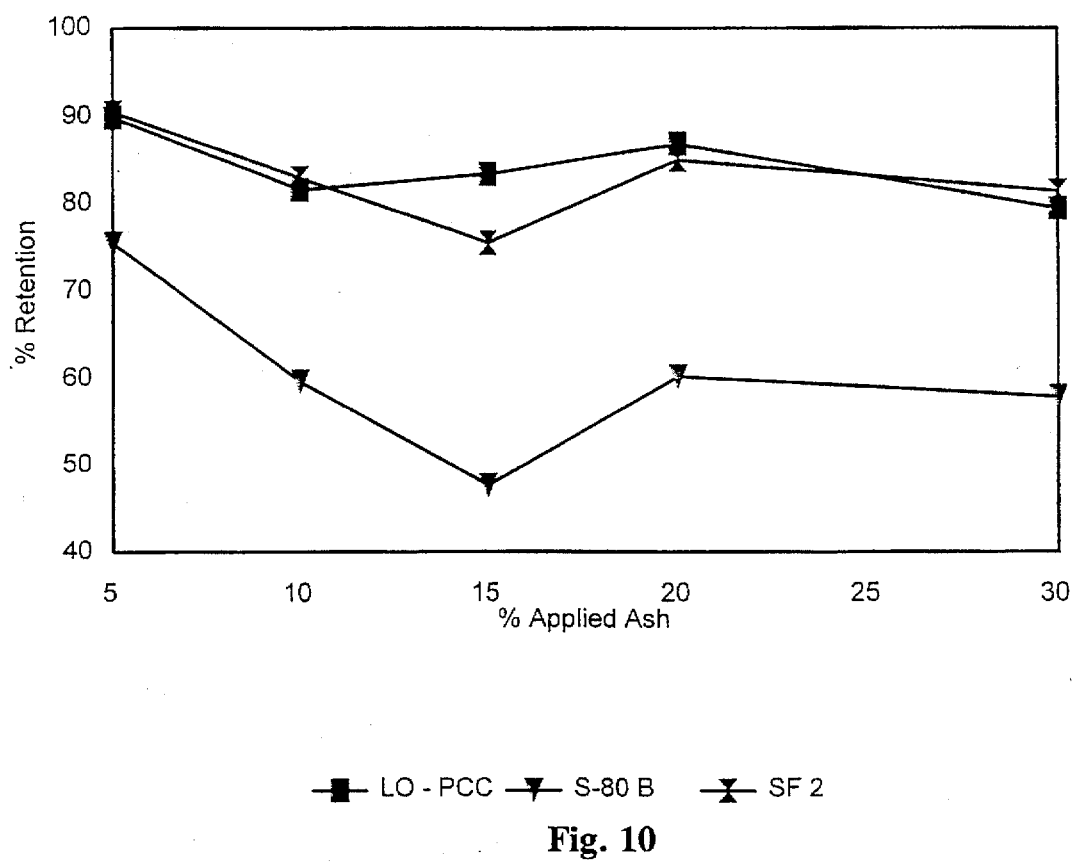
FIG. 10: Displays the percent ash retention values for a Albacar LO, Microna S-80 B and SF 2 as a function of applied ash.

FIG. 10 displays the relationship between the applied ash (added to the furnish) and the final ash in the paper web for the various filler pigments. Percent retention is defined as (final ash)/(applied ash)×100%. As can be seen from these data the product of this invention has retention characteristics similar to the coarse, bulky scalenohedral Albacar LO pigment, and is significantly better retained than the untreated highly anionically surface charged Microna S-80 B pigment, which is poorly retained in the fiber web at all filler levels.

Figure 11:
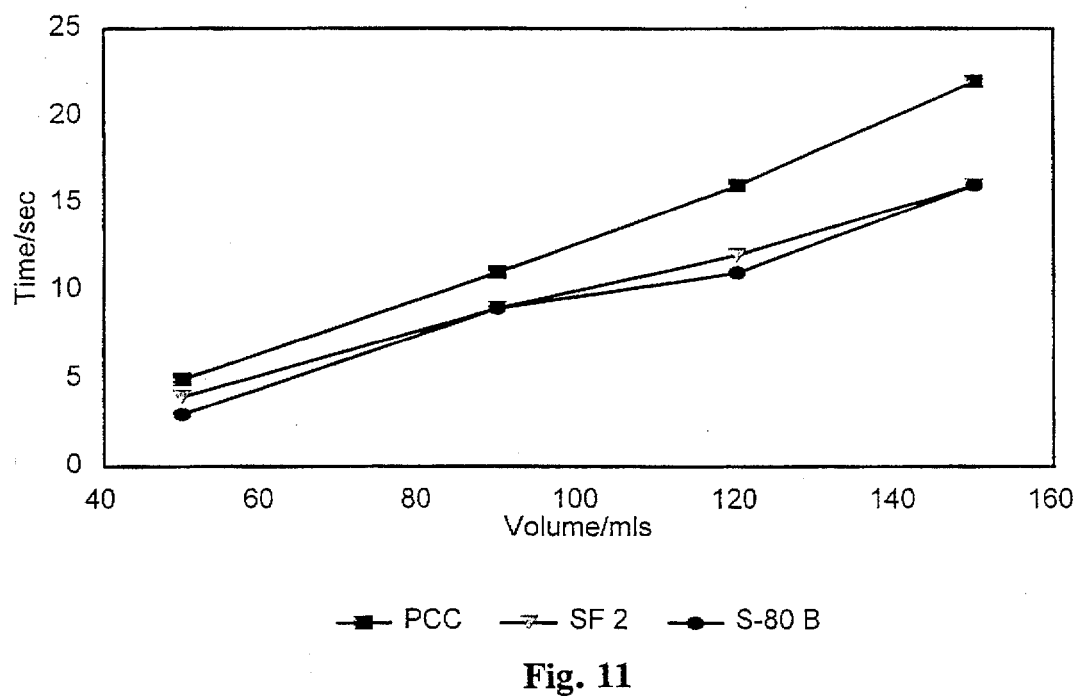
FIG. 11: Displays pulp vacuum assisted drainage data for Albacar LO, Microna S-80 B and SF 2.

Vacuum assisted drainage data at 20% filler addition are displayed in FIG. 11. From these data it can be seen that the product of the current invention, SF 2, does not significantly retard the drainage of the fiber web relative to the well draining rhombohedral, low surface area pigment, Microna S-80 B. Albacar LO, which is a pigment with a scalenohedral morphology and significant internal porosity, retards drainage of the fiber web by up to 40% relative to SF 2 and Microna S-80 B.

Figure 12:
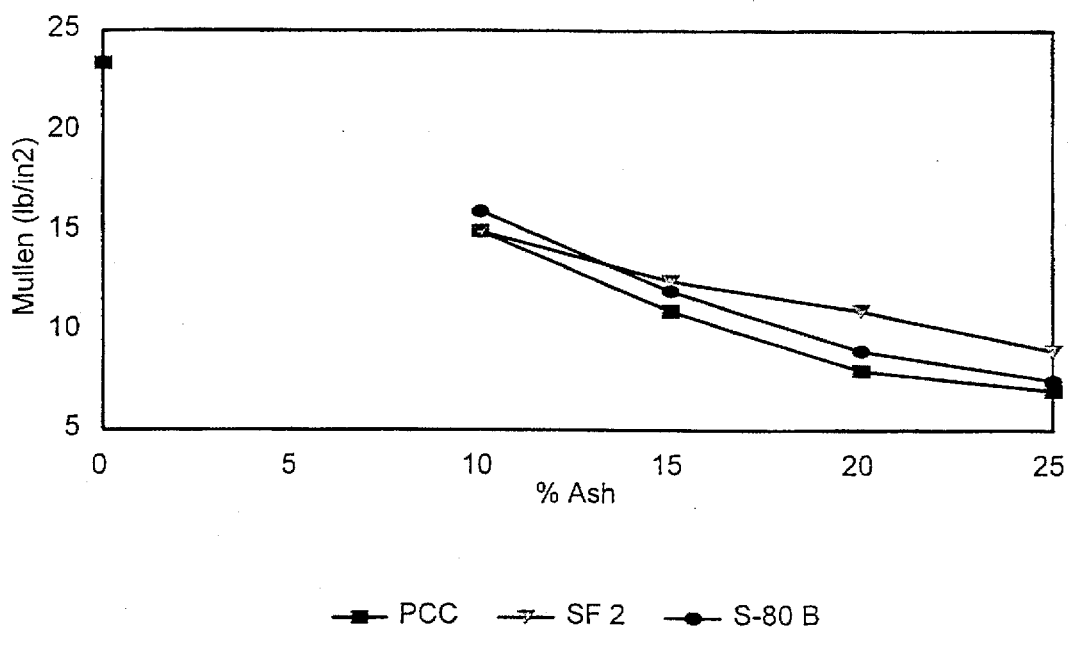
FIG. 12: Displays interpolated handsheet strength data (Mullen) as a function of Albacar LO, Microna S-80 B and SF 2 filler level.

Handsheet strength data are displayed in FIG. 12. From these data it can be seen that the PCC pigment Albacar LO impacts sheet strength more than does Microna S-80 B, with the product of the present invention, SF 2, having least impact on sheet strength.

Figure 13:
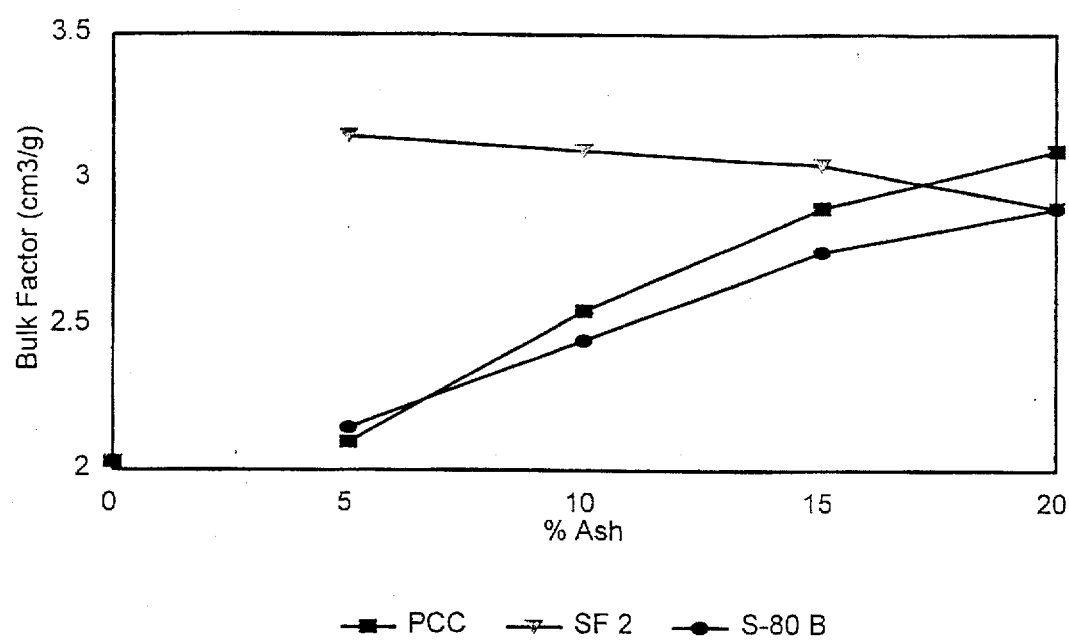
FIG. 13: Displays interpolated handsheet bulk factors for Albacar LO, Microna S-80 B and SF 2 at various filler levels.

The impact of filler type on handsheet bulk factor is displayed in FIG. 13. From these data it can be clearly seen that the product of the present invention, SF 2, gives significantly more bulk to the fiber web than does Microna S-80 B and Albacar LO. Sheet bulk is defined as (average caliper)/(average basis weight)×25.4 and is reported in $cm^3/g$.

Figure 14:
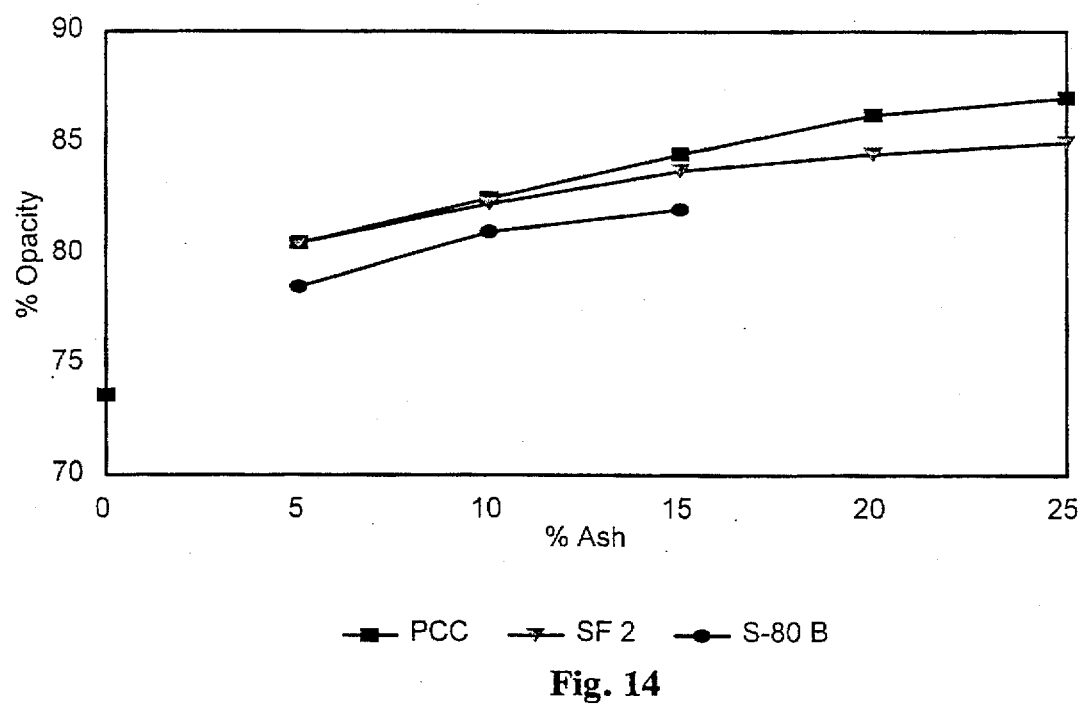
FIG. 14: Displays interpolated handsheet opacity data for Albacar LO, Microna S-80 B and SF 2 at various filler levels.

Handsheet opacity data are displayed in FIG. 14. These data show that the product of the present invention, SF 2, has significantly improved opacity relative to the untreated mineral filler, Microna S-80 B. SF 2 handsheet opacity data were, within the errors of measurement, equivalent to those of Albacar LO at filler levels up to 15% ash.

EXAMPLE 13

Mercury intrusion porosimetry analysis of Albacar LO, Albacar HO, SF 2 and SF 3 were carried out by Micromeritics, Norcross, Ga. These data, which are displayed in the table below, show that the scalenohedral, synthetic, precipitated calcium carbonate pigments (Albacar LO and HO) have significantly higher internal pore volumes than the products of the present invention (SF 2 and SF 3).

| Pigment | Pore Volume (ml/g) | Average Pore Diameter (microns) |
| --- | --- | --- |
| Albacar LO | 0.918 | 0.405 |
| Albacar HO | 1.361 | 0.337 |
| SF 2 | 0.255 | 0.081 |
| SF 3 | 0.270 | 0.085 |

Albacar HO is a higher opacifying pigment than Albacar LO, which is supported by the pore volume data above. Data from example 12 above shows that SF 2 has comparable light scattering ability to Albacar LO at filler levels up to 15% ash, which would not be predicted from the pore volume data. The assemblage of fine and colloidal particles formed in the present invention clearly produces a number of smaller interconnecting pores that must also effectively scatter light.

The low total internal pore volume of the products of the present invention (when compared to Albacar LO and HO) support the good drainage and web strength data shown in example 12 above.

EXAMPLE 14

Figure 15:
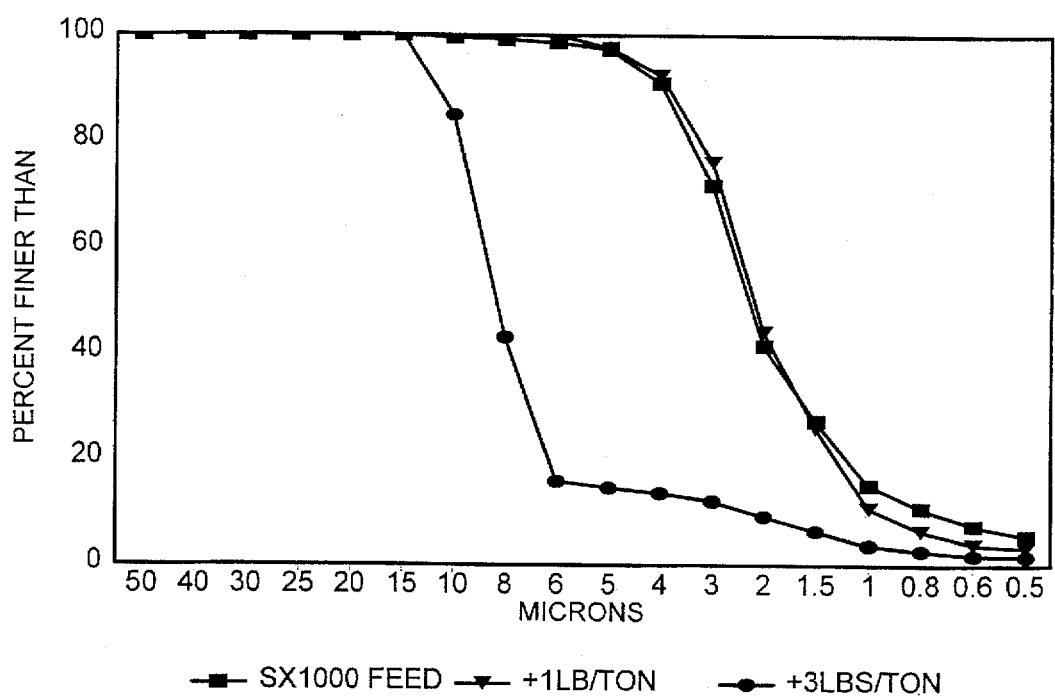
FIG. 15: Displays the effect of adding various quantities of the cationically charged polyelectrolyte Agefloc WT50 SLV to a 10% solids suspension of the "clustered prismatic" precipitated calcium carbonate pigment, SX 1000.

A sample of SX 1000 which is a "clustered prismatic" synthetic precipitated calcium carbonate pigment was diluted to 10% solids in water. To this feed pigment suspension was added a 1% (weight/weight) aqueous solution of Agefloc WT50 SLV, with stirring. The mean particle size of the feed precipitated calcium carbonate was determined as 2.27 microns, containing some 7% by weight of particles in the fine range. A 3 lbs/t addition of the cationic polyelectrolyte Agefloc WT50 SLV produced an aggregated product with a mean particle size of 8.29 microns that contained no fine particles in suspension. The surface charge on the pigment was changed from −0.073 ueg/g (feed), to +2.863 ueg/g after treatment. FIG. 15 shows the particle size curves for the feed and treated materials of this example.

EXAMPLE 15

Figure 16:
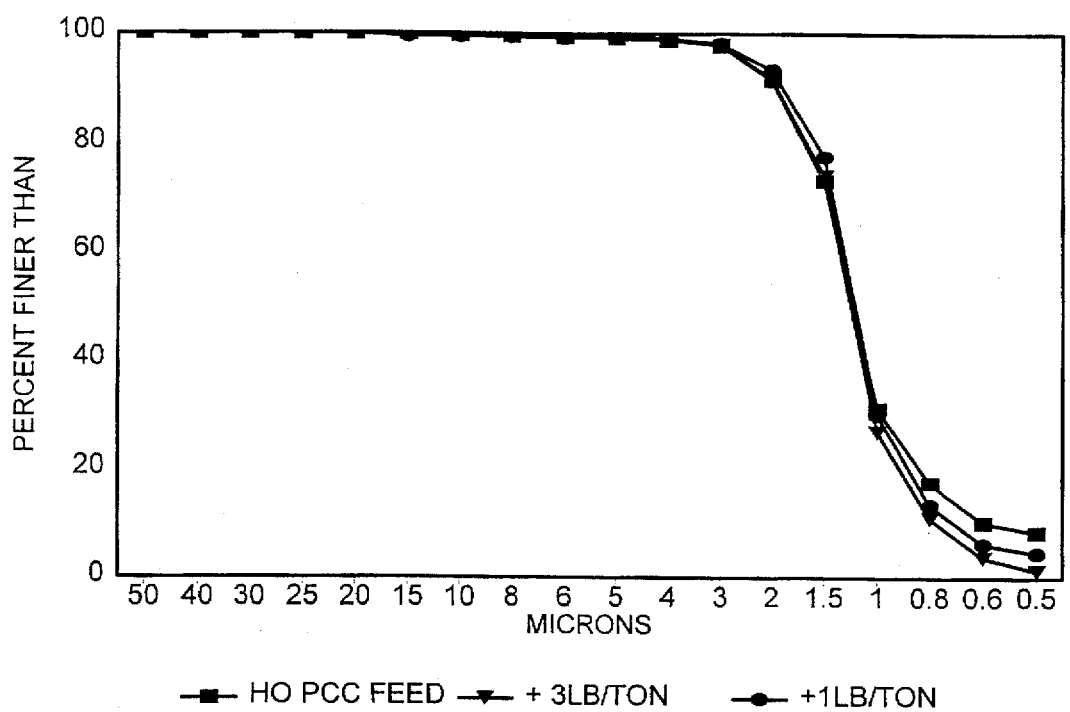
FIG. 16: Displays the effect of adding various quantifies of the cationic polyelectrolyte Agefloc WT50 SLV to a 10% solids suspension of the scalenohedral precipitated calcium carbonate pigment, Albacar HO.

A sample of Albacar HO, which is a scalenohedral morphology synthetic precipitated calcium carbonate pigment, was diluted to 10% solids in water. To this feed pigment suspension was added a 1% (weight/weight) aqueous solution of Agefloc WT50 SLV, with stirring. The mean particle size of the feed precipitated calcium carbonate was determined as 1.21 microns, which contained some 9% by weight of particles in the fine range. A 3 lbs/t addition of the cationic polyelectrolyte Agefloc WT50 SLV produced an aggregated product with a mean particle size of 1.22 microns that contained no fine particles in suspension. The surface charge on the pigment was changed from −0.098 ueg/g (feed), to +3.46 ueg/g after treatment. FIG. 16 shows the particle size curves for the feed and treated materials of this example.

EXAMPLE 16

Figure 17:
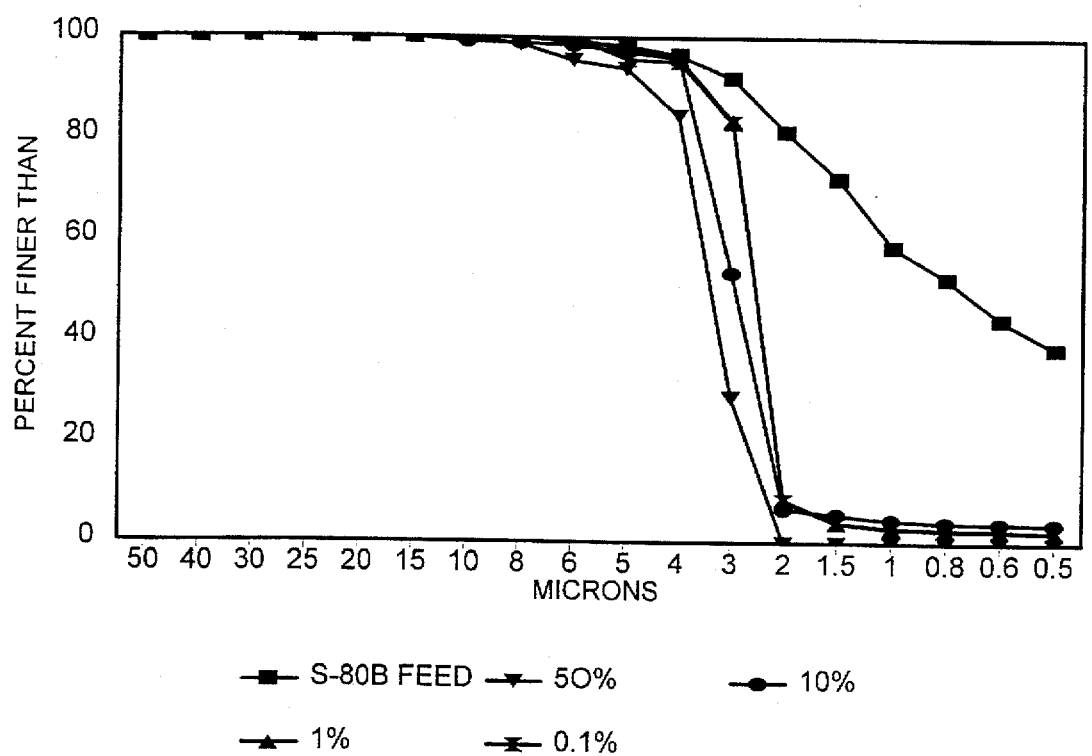
FIG. 17: Displays the effect of addition of two different cationic polyelectrolytes on the aggregation of the fines present in Microna S-80 B.

To a feed mineral suspension composed of Microna S-80 B at 10% solids in water was added 5 lbs/t of the cationic polyelectrolyte Agefloc WT50 SLV. The concentration of the cationic polyelectrolyte was varied from 0.1% (weight/weight) in water to 50% (weight/weight) in the treatment experiments. FIG. 17 displays these data which show that the polymer concentration used to treat the feed mineral slurry has little or no impact on the extent of aggregation of the fines present in the feed mineral slurry.

EXAMPLE 17

Figure 18:
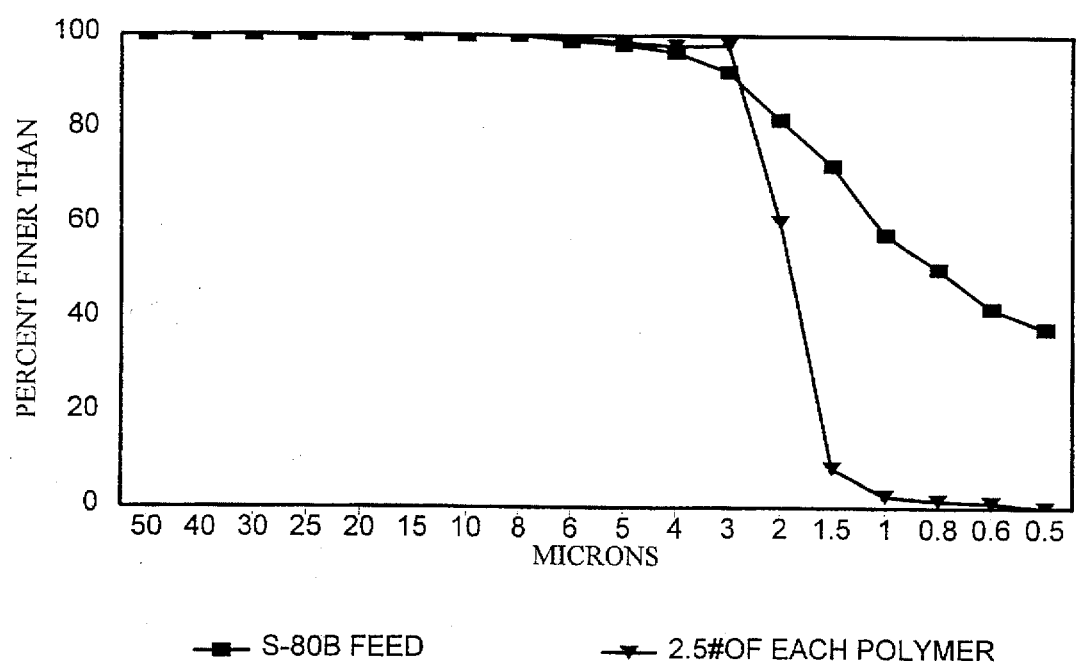
FIG. 18: Displays the effect of a 5 lbs/t addition of the cationic polyelectrolyte Agefloc WT50 SLV at different concentrations on the extent of aggregation of a Microna S-80 B feed mineral slurry.

To a feed mineral suspension composed of Microna S-80 B at 10% solids in water, containing 80% by weight of particles finer than two microns and 40% by weight of particles finer than 0.5 microns, was added 2.5 lbs/t of a 1.0% solution of the cationic polyelectrolyte Agefloc WT50 SLV and 2.5 lbs/t of a 1.0% solution of the cationic polyelectrolyte Agefloc B50, with mixing. FIG. 18 displays the data from this experiment which show that combinations of cationic polyelectrolytes can be effectively used to treat the feed mineral slurry, resulting in a product that contains no fine particles in suspension. The product of this example is indistinguishable from that of the product SF 2 described in example 8 above.

EXAMPLE 18

The paper web retention values of samples SF 3, SF 4 and SF 5, produced in examples 9, 10 and 11, were compared to that of LO-PCC in order to determine if the surface charge of the aggregated product dominates retention. The same fiber blend and retention aid system was used as described in example 12 above, with filler additions of 10, 15, 20 and 25% ash. Percent retention of a filler pigment in a paper web is defined as (final ash)/(applied ash)×100%.

SF 3 has a mean particle size of 3.51 microns and a surface charge of −7.66 ueg/g. SF 4 has a mean particle size of 2.14 microns and a surface charge of −3.01 ueg/g. SF 5 has a mean particle size of 1.76 microns and a surface charge of −20.46 ueg/g.

Figure 19:
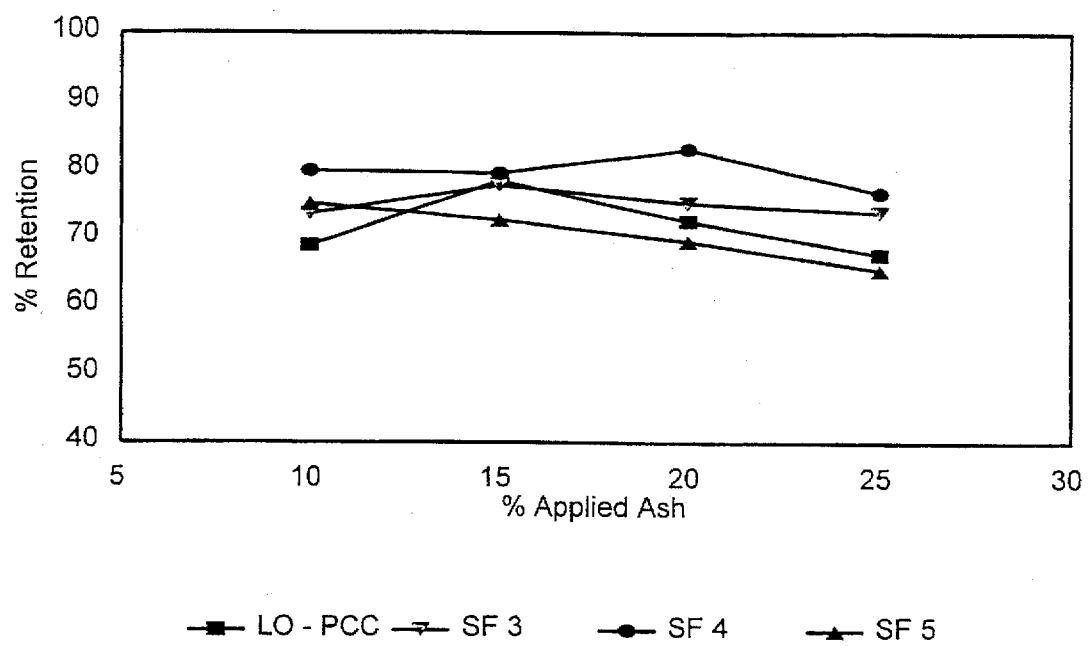
FIG. 19: Displays the effect of aggregated pigment particle surface charge on paper web retention for the fillers SF 3, SF 4 and SF 5.

FIG. 19 displays the retention data from hand sheet study #2 which show that all three products of this invention were retained as well, if not better than, the sample of LO-PCC. The PCC sample used in this example has a coarse, scalenohedral particle morphology, with a mean particle size of 2.25 microns and a surface charge of −0.099 ueg/g. Clearly, aggregation of the fine fraction of a given filler pigment, vastly improves its retention in a fiber web (see FIG. 10), ash retention seems to be high for all the products of this invention, irrespective of the surface charge of the aggregated filler particles.

EXAMPLE 19

Samples of Microna S-80 B, SF 2 and SF 3 were subjected to Einlehner AT 1000 abrasion testing. In this test the wear on a bronze wire developed by a 10% mineral slurry is quantified as a weight loss factor. Typically, as mineral slurry particle size increases, the abrasion or weight loss of the bronze wire will increase. Mineral pigment abrasion is important to papermakers as more abrasive pigments will incur greater down time on a paper machine from changing worn out formation wires, and will wear slitting or conversion equipment used to turn rolls of paper into individual sheets.

The Einlehner abrasion data in the table below show that despite an increase in the mean particle size of the pigments SF 2 and SF 3 relative to the feed mineral slurry Microna S-80 B, no increase in bronze wire wear is noticed. This would be expected as the intrinsic particle size distribution of the three products are all the same, the only difference is the polyelectrolyte treatment carried out to form SF 2 and SF 3. SF 2 and SF 3 are therefore not hard aggregated or fused products like calcined clays.

| Product Name | Mean Particle Size | Einlehner Abrasion |
|---|---|---|
| Microna S-80 B | 0.9 microns | 7.3 mg loss |
| Microna SF 2 | 1.86 microns | 6.8 mg loss |
| Microna SF 3 | 3.51 microns | 7.4 mg loss |

EXAMPLE 20

A sample of Microna S-80 B, which is a commercially available, anionically dispersed, ground calcium carbonate pigment slurry containing 80% by weight of particles finer than 2 microns and 40% by weight of particles finer than 0.5 microns, was diluted to a solids level of 10% with water. To this feed mineral suspensions was added, with stirring, a solution of 1.0% (weight/weight in water) of alum. Doze rates of 5, 10, and 20 lbs/t alum to Microna S-80 B (dry on dry) were used for the experiments.

Figure 20:
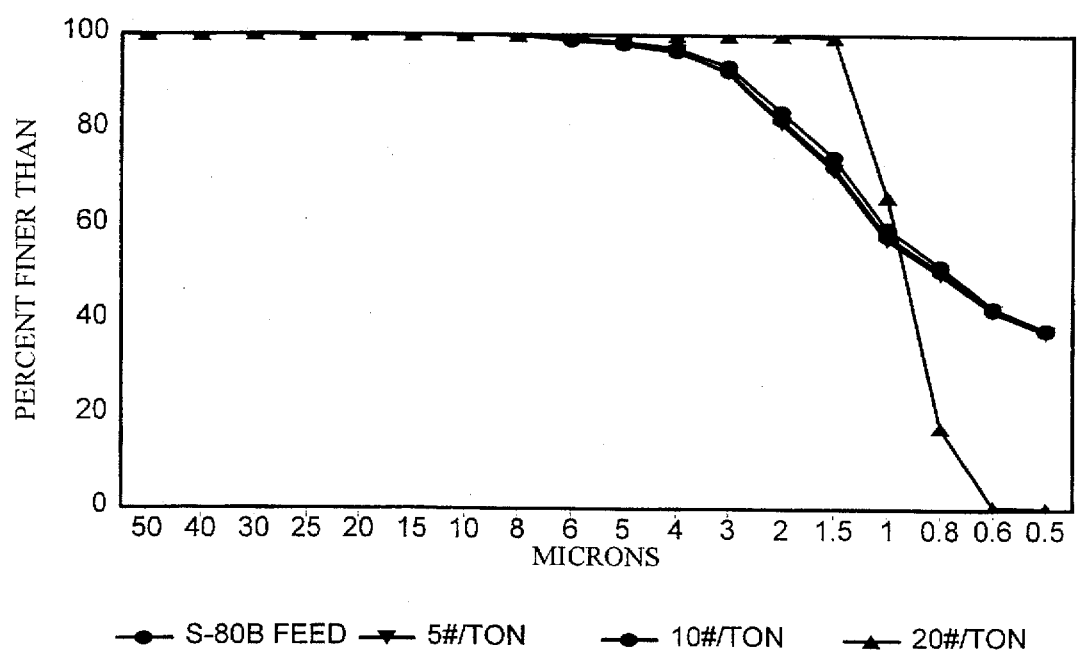
FIG. 20: Displays the effect of 5, 10 and 20 lb/t additions of alum on the particle size curve of a 10% solids suspension of Microna S-80 B.

The data displayed in FIG. 20 show the impact of the addition of alum on the particle size curve of Microna S-80 B. From these data it can be seen that at a doze rate of 20 lbs/t aggregation of the fines present in the feed mineral slurry takes place such that no fines are present in the sample after the treatment process. The particle surface charge was changed from $-21.3$ ueg/g for the feed mineral slurry Microna S-80 B to $+4.86$ ueg/g for the aggregated product of this invention.

EXAMPLE 21

By way of further comparing currently available paper filler mineral pigments, a series of laboratory handsheets were made (hand sheet study #3) using a blend of 30% hardwood, 40% secondary fiber and 30% long fiber. The following polymer wet end additives were sequentially added to the fiber blend with mixing; 15 lbs/t of cationic potato starch, 1.5 lbs/t of ASA size and 0.4 lbs/t of an anionic retention aid. Final pulp consistency was 0.3%. To the furnish, with all of the additives present, was added varying amounts of the cationic filler pigment SF 1, and anionic filler pigment Microna S-80 B.

Figure 21:
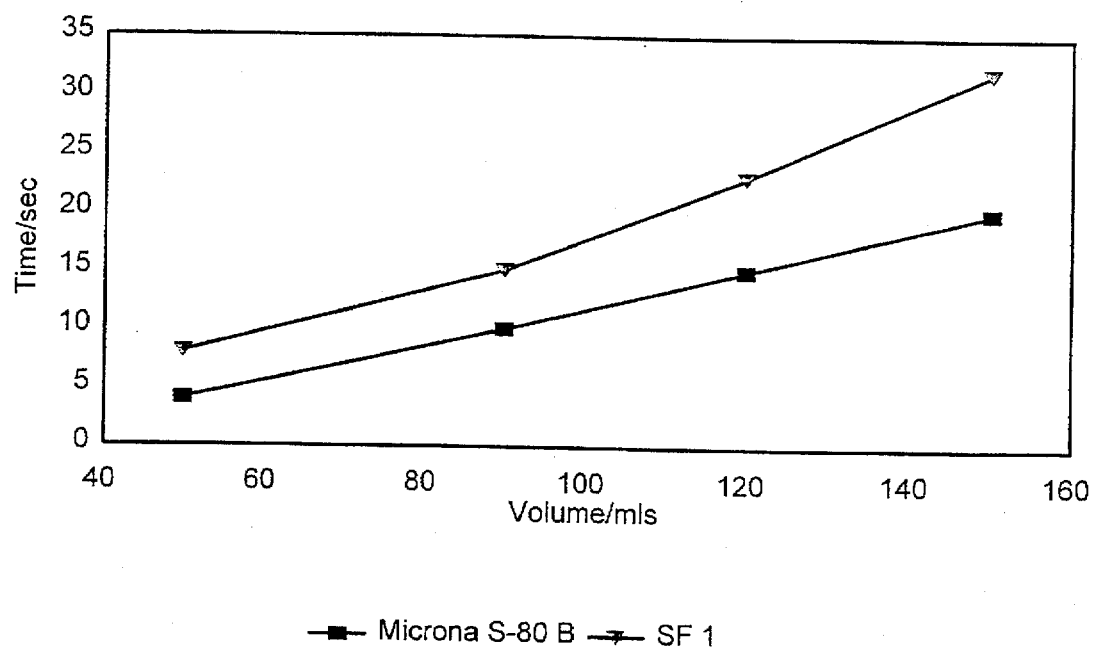
FIG. 21: Displays pulp vacuum assisted drainage data for Microna SF 1 and Microna S-80 B.

Vacuum assisted drainage data at 20% filler addition are displayed in FIG. 21. From these data it can be seen that the cationic product SF 1 significantly retards the drainage of the fiber web relative to the well draining rhombohedral, low surface area anionically dispersed pigment, Microna S-80 B. Retardation of web drainage with SF 1 is believed to be a consequence of the positive charge that SF 1 adds to the pulp, resulting in over flocculation of the fibers, and poor drainage.

Figure 22:
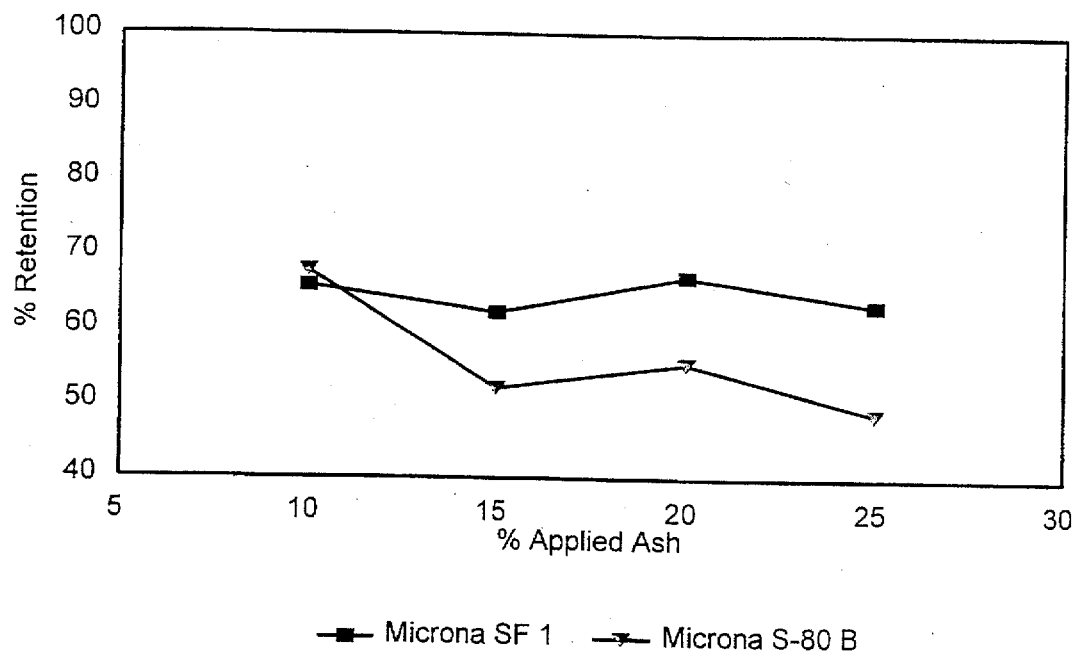
FIG. 22: Displays the percent ash retention values for Microna SF 1 and Microna S-80 B as a function of applied ash.

FIG. 22 displays the relationship between the applied ash (added to the furnish) and the final ash in the paper web for these two filler pigments. Percent retention is defined as (final ash)/(applied ash)×100%. As can be seen from these data the cationic pigment SF 1 has retention characteristics better than Microna S-80 B but not as good as the coarse, bulky scalenohedral Albacar LO pigment (see FIG. 10) or the products of this invention shown in FIGS. 10 and 19.

EXAMPLE 22

A sample of Microna SF 1, which is a cationically dispersed, ground calcium carbonate pigment slurry containing 88% by weight of particles finer than 2 microns and 11% by weight of particles finer than 0.5 microns, was diluted to 10% solids with water. To this feed mineral suspensions was added, with stirring, a solution of 1.0% (weight/weight in water) of the anionic polyelectrolyte Acumer 9400 which has an estimated molecular weight between 1,000 and 10,000. Doze rates of 1, 3, and 5 lbs/t Acumer 9400 to Microna SF 1 (dry on dry) were used in the treatment experiments.

Figure 23:
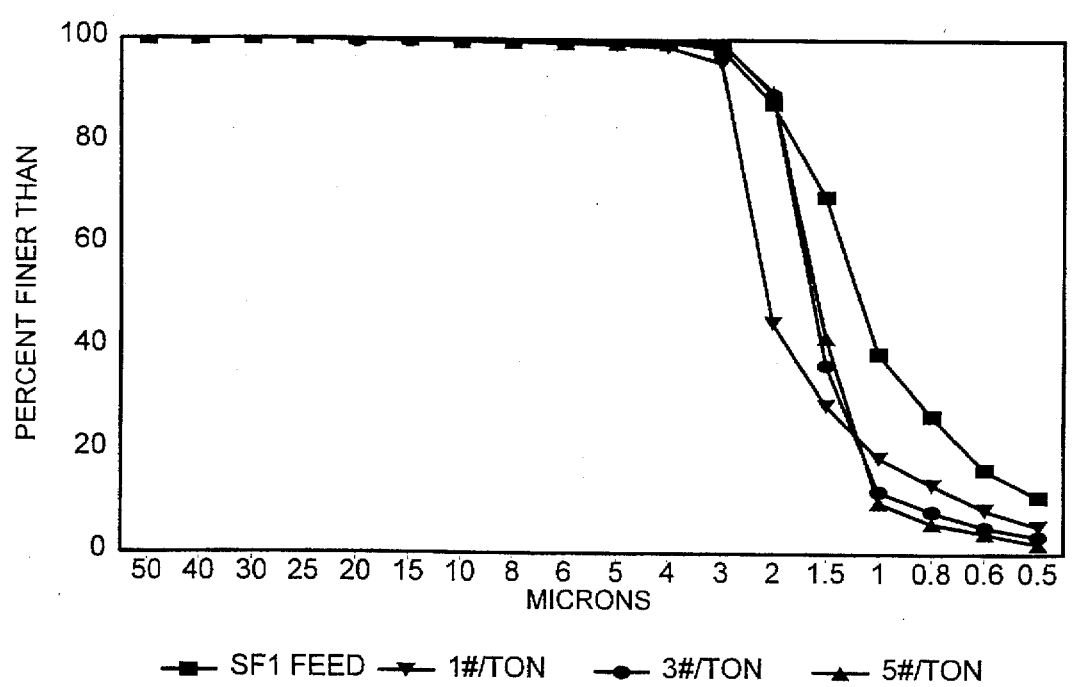
FIG. 23: Displays the effect of 1, 3 and 5 lbs/t addition of the anionic polyelectrolyte, Acumer 9400, on the cationically dispersed mineral SF 1 at 10% solids.

FIG. 23 shows the data from these experiments which clearly demonstrate that the addition of a low molecular weight anionic polyelectrolyte to the cationically surface charged and dispersed feed material results in selective aggregation of the free component of the feed material when the treatment is carried out at low solids. The surface charge of the aggregated product was reduced from +42.1 ueg/g to +37.48 ueg/g after a 1 lb/t addition of the low molecular weight anionic polyelectrolyte, +16.4 ueg/g after 3 lbs/t addition, and +2.68 ueg/g after 5' lbs of the anionic polyelectrolyte had been added to the feed material.

EXAMPLE 23

A sample of Windsor clay, which is an air floated kaolin product with 90% by weight of particles finer than 2 microns, 68% by weight of particles finer than 0.5 microns and 40% by weight of particles finer than 0.2 microns, was dispersed in Water at 60% solids with 12 lbs/t of Acumer 9400. This feed mineral slurry was used as a feed for all of the subsequent treatment experiments.

The feed mineral slurry was diluted to 10% solids with water and the cationic polyelectrolyte, Agefloc WT50 SLV, was added to the mineral slurry at doze rates varying from 3 lbs/t to 30 lbs/t, with mixing. Agefloc WT50 SLV is a cationic polyelectrolyte with an estimated molecular weight in the range 10,000 to 50,000 as outlined above. The resultant products of these experiments were analyzed for particle size distribution with a Micromeritics "Sedigraph, 5100" particle size analyzer, and surface charge with a Mutek, PCD 02 Particle Charge Detector.

FIG. 2 displays the data from the treatment experiments. From these data it can be seen that the cationic polyelectrolyte completely aggregates the ultra-fine particles present in the feed kaolin slurry at a doze rate of 10 lbs/t. At higher doze rates, 20 and 30 lbs/t, complete aggregation of the fine particles present in the feed kaolin slurry also takes place. The surface charge on the kaolin particles and mean particle size changed as shown in the table below:

| lbs/t Polymer added | Mean particle size (microns) | Surface charge (ueg/g) |
|---|---|---|
| None (feed) | 0.23 | −58.4 |
| 10 lbs/t | 0.34 | −30.5 |
| 20 lbs/t | 0.85 | −19.7 |
| 30 lbs/t | 0.86 | −16.4 |

Addition of cationic polyelectrolyte over and above 20 lbs/t did not significantly increase the mean particle size of the aggregated product, but did result in a decrease in the surface charge of the product.

EXAMPLE 24

Figure 24:
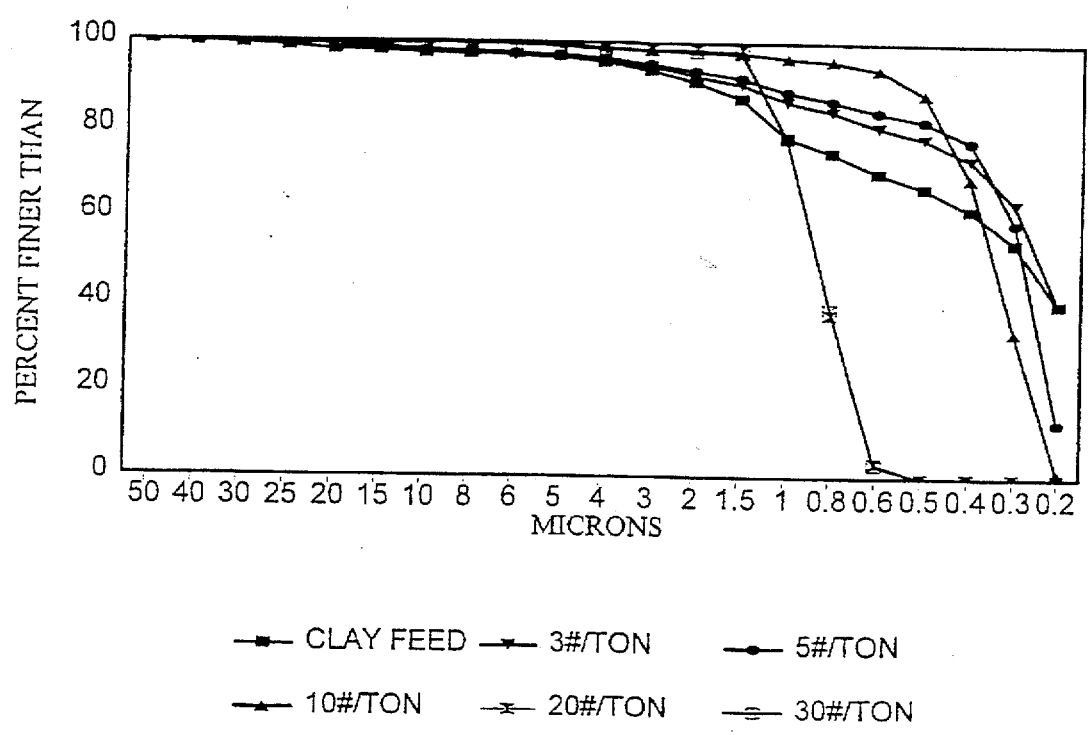
FIG. 24: Displays the effect of various different addition levels of the cationic polyelectrolyte Agefloc WT50 SLV on the particle size distribution of a 10% solids slurry of a Windsor kaolin pigment.

In this example the feed kaolin mineral slurry, as described in example 23 above, was diluted to a range of different solids contents. These kaolin slurries were treated with 10 lbs/t of the low molecular weight cationic polyelectrolyte, Agefloc WT50 SLV, with stirring. The resultant products were analyzed for particle size distribution. Data from these experiments is displayed in FIG. 24. From these data it can be seen that as the treatment solids increases, the treatment process becomes less selective, with general aggregation of the ultra-fines and fines taking place at solids levels above 10%.

EXAMPLE 25

Figure 25:
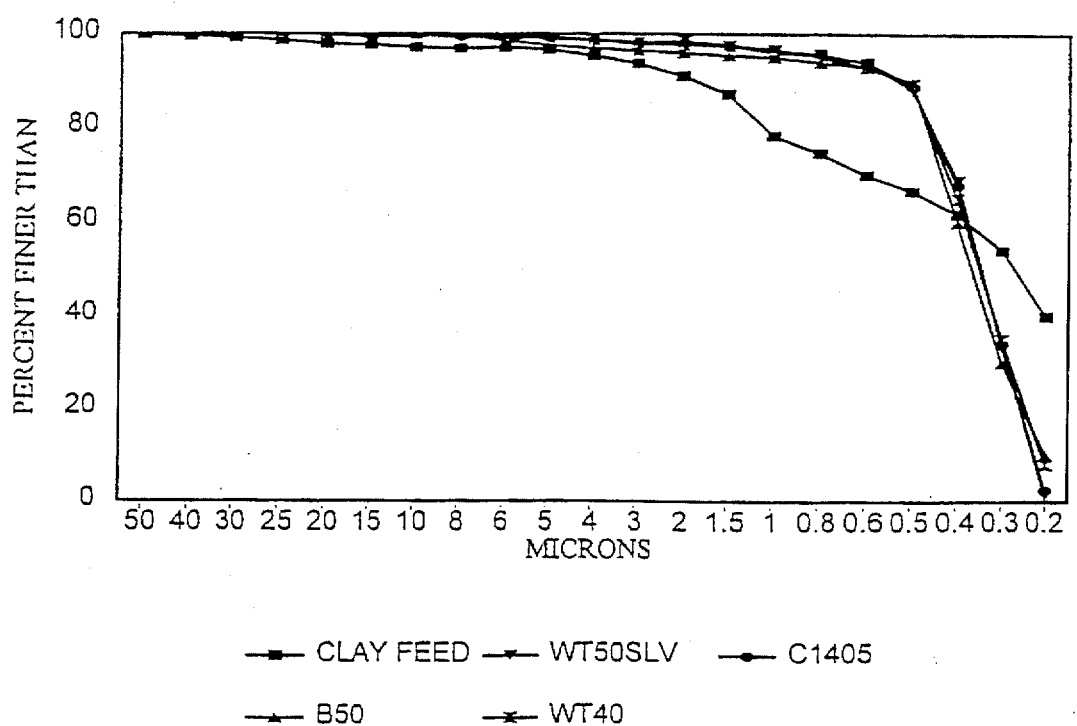
FIG. 25: Displays the effect of 10 lb/t additions of various different cationic polyelectrolytes upon the particle size distribution of Windsor kaolin clay dispersed at 10% solids in water.

A sample of the feed kaolin mineral slurry from example 23 above was diluted to 10% solids and treated with a range of differing cationic polyelectrolytes with molecular weights ranging from 10,000 to 400,000 as outlined above. The cationic polyelectrolytes were added to the kaolin slurry with mixing. FIG. 25 displays the data from these treatment experiments, which show that the ultra-fine particles present in a kaolin slurry can be selectively aggregated with a range of differing cationic polyelectrolytes. The mean particle size of all of the treated products is 0.34 microns which is greater than that of the feed mineral slurry. The particle surface charge of the aggregated products was lower than that of the feed mineral slurry as described in example 24 above.

EXAMPLE 26

Figure 26:
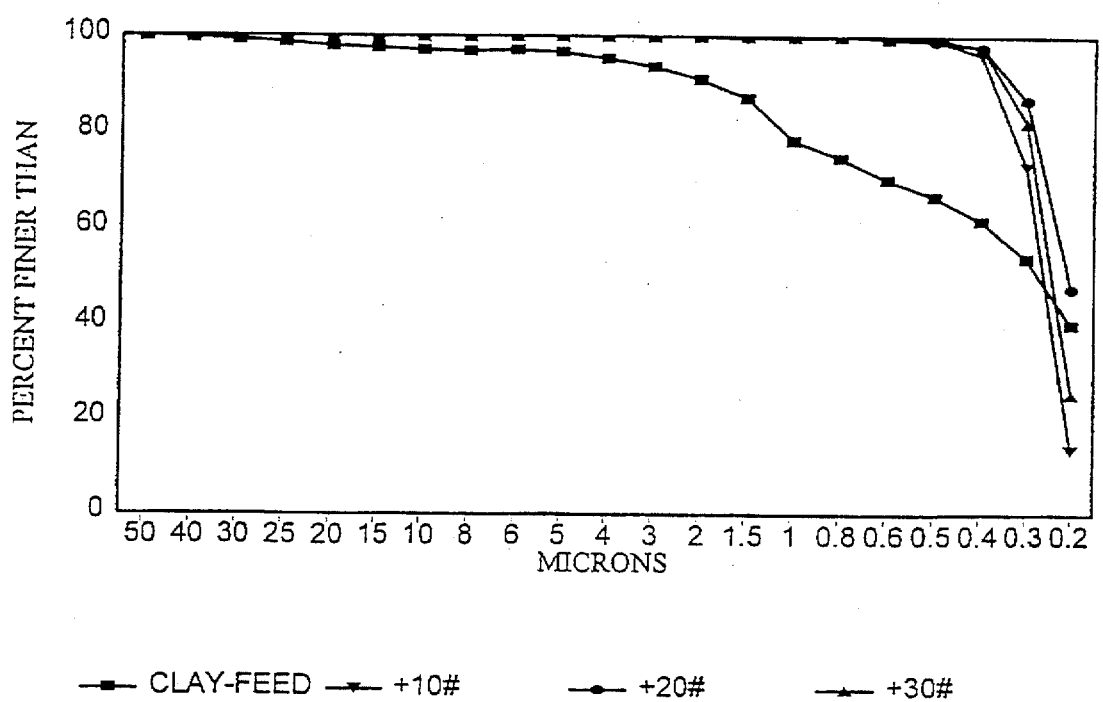
FIG. 26: Displays the effect of increasing additions of alum on the aggregation of the fines and ultra-fines present in a 10% solids suspension of the kaolin mineral Windsor.
Figure 27:
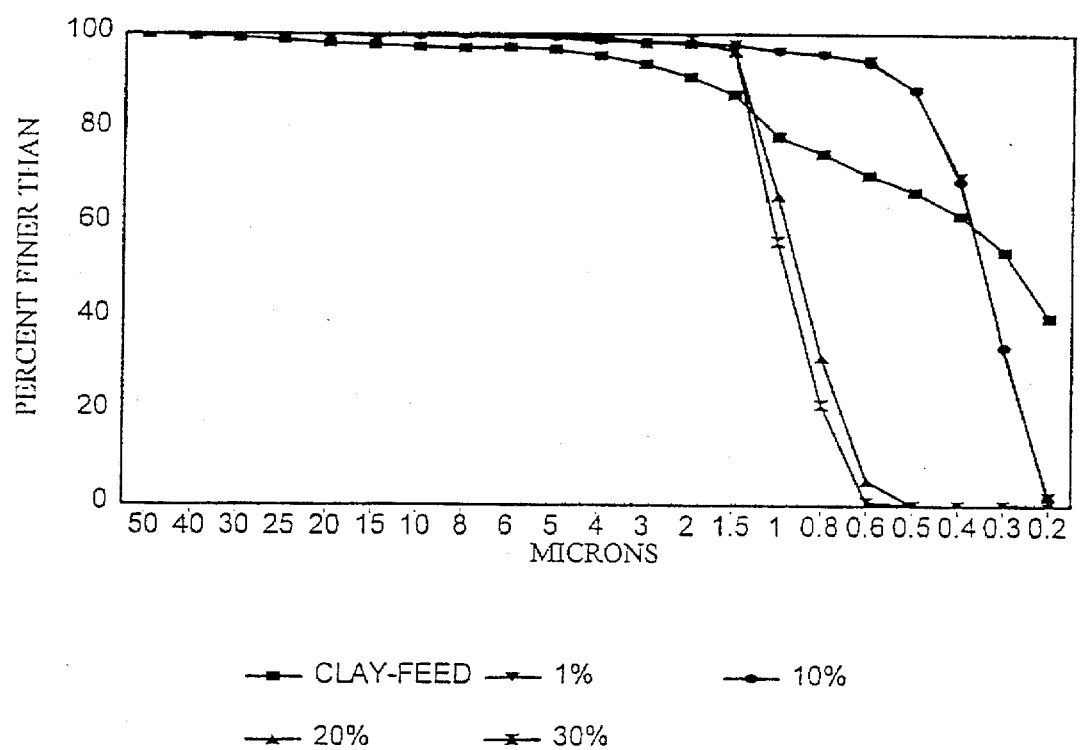
FIG. 27: Displays the effect of different Windsor kaolin clay feed solids on the extent of aggregation of the fine and ultra-fine particles present in the mineral suspension with the addition of 10 lbs/t of the cationic polyelectrolyte Agefloc WT50 SLV.

A sample of the feed kaolin mineral slurry from example 23 above was diluted to 10% solids and treated with alum at a range of different doze levels, with mixing. FIG. 26 displays the data from these treatment experiments, which show that the ultra-fine particles present in a kaolin slurry can be selectively aggregated with alum as the cationic agent.

| Alum addition (lbs/t) | Surface charge (ueg/g) |
|---|---|
| None (feed) | −58.4 |
| 20 lbs/t | −40.5 |
| 30 lbs/t | −28.5 |
| 40 lbs/t | −20.2 |

Data in the table above shows that the particle surface charge is decreases as alum doze rate increases. This is the same effect as the addition of the cationic polyelectrolyte Agefloc WT50 SLV described in example 23 above.

EXAMPLE 27

In this example 10 and 30 lbs/t additions of the high molecular weight cationic polyelectrolyte, Westcat E-F, were made to a 10% solids dispersion of Windsor kaolin clay with stirring. Windsor is a commercially available air floated kaolin pigment which has 90% by weight of particles finer than two microns, 68% by weight of particles finer than 0.5 microns and 40% by weight of particles finer than 0.2 microns. Westcat E-F, which is a cationic starch, has an estimated molecular weight between 3,000,000 and 3,500,000 as detailed above. The particle size distribution of the resultant products was determined with a Micromeritics "Sedigraph 5100" Particle Size Analyzer.

Figure 28:
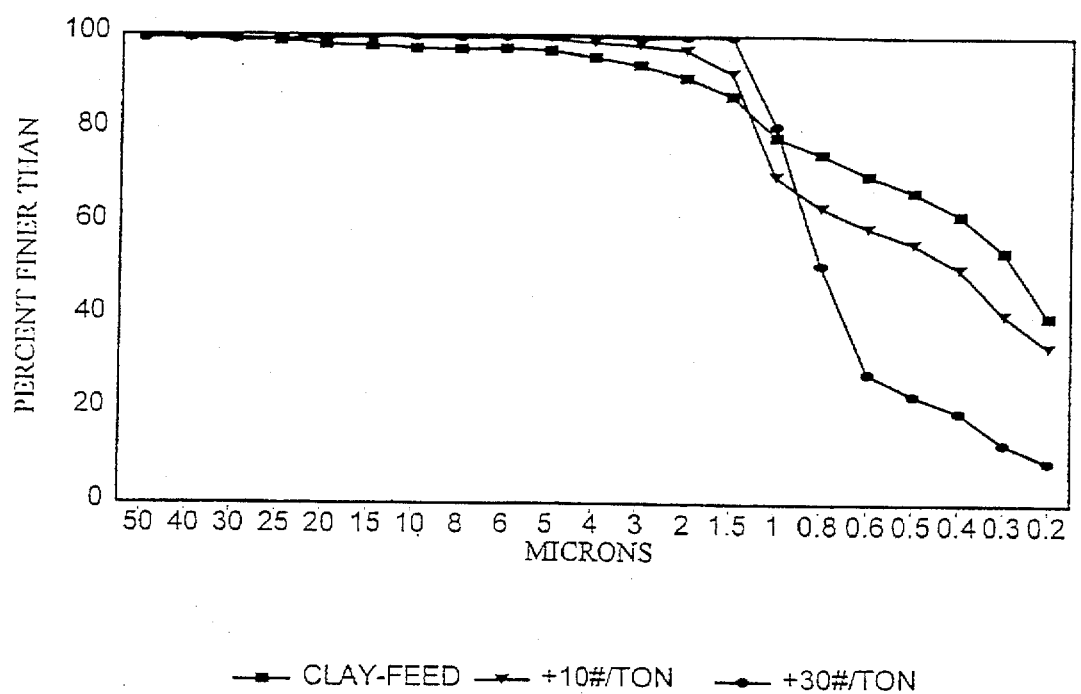
FIG. 28: Displays the effect of adding 10 lbs/t and 30 lbs/t of the high molecular weight cationic polyelectrolyte, Westcat E-F, on the particle size distribution of a 10% solids dispersion of Windsor kaolin clay.

FIG. 28 displays these data, which show that as the amount of cationic starch increases general flocculation of all of the particles present in the feed mineral slurry takes place, with the particle size curve displaced to a higher mean particle size at higher cationic starch doze rates. At 10 lbs/t cationic starch treatment level there are still some 33% by weight of particles finer than 0.2 microns present in the mineral slurry, and at 30 lbs/t cationic starch treatment level there are still some 23% of particles finer that 0.5 microns and 9% by weight of particles finer than 0.2 microns present in the mineral slurry.

EXAMPLE 28

A sample of Microna S-90 HB, which is a commercially available, anionically dispersed, ground calcium carbonate paper coating pigment slurry containing 90% by weight of particles finer than 2 microns and 45% by weight of particles finer than 0.5 microns, was diluted to 10% solids by weight in water. To this feed mineral suspension was added, with stirring, a solution of 1.0% (weight/weight in water) cationic potato starch, Westcat E-F, with an estimated molecular weight of 3,000,000 to 3,500,000. Doze rates of 3 lbs/t and 6 lbs/t cationic starch to Microna S-90 HB (dry on dry) were added to the feed mineral slurry.

The particle surface charge of the anionically dispersed Microna S-90 HB feed mineral slurry was determined as −36.6 ueg/g. After treatment with 3 lbs/t of the cationic potato starch the mineral surface charge was reduced to −11.8 ueg/g, and after treatment with 6 lbs/t of the cationic potato starch the mineral surface charge was determined as −8.4 ueg/g.

FIG. 2 shows the impact of the cationic starch treatment on the particle size distribution of Microna S-90 HB as determined by a Micromeritics "Sedigraph 5100" particle size analyzer. These data show that as the amount of cationic starch increases general flocculation of all of the particles present in the feed mineral slurry takes place, with the particle size curve simply displaced to a higher mean particle size at higher cationic starch doze rates. At 6 lbs/t cationic starch treatment level there are still some 30% by weight of particles finer than 0.5 microns present in the mineral slurry.

EXAMPLE 29

A sample of Microna S-80 B, which is a commercially available, anionically dispersed, ground calcium carbonate paper coating pigment slurry containing 80% by weight of particles finer than 2 microns and 40% by weight of particles finer than 0.5 microns, was diluted to a range of differing solids levels with water. To this feed mineral suspensions was added, with stirring, a solution of 1.0% (weight/weight in water) of the cationic polyelectrolyte Agefloc WT50 SLV which has an estimated molecular weight between 10,000 and 50,000. A doze rate of 5 lbs/t Agefloc WT50 SLV to Microna S-80 B (dry on dry) was used for all the treatment experiments.

FIG. 3 shows these data which clearly demonstrate that the addition of a low molecular weight cationic polyelectrolyte to the anionically surface charged and dispersed feed mineral slurry results in selective aggregation of the fines component of the feed material when the treatment is carried out at low solids. From these data it can be seen that if the mineral feed slurry is 10% solids or lower prior to treatment with the low molecular weight polyelectrolyte, complete aggregation of the fines present in the feed mineral slurry takes place.

EXAMPLE 30

A sample of Microna S-90 HB, which is a commercially available, anionically dispersed, ground calcium carbonate coating pigment slurry containing 90% by weight of particles finer than 2 microns and 45% by weight of particles finer than 0.5 microns, was diluted to 10% solids by weight in water. To this feed mineral suspension was added in separate experiments, with stirring, a solution of 1.0% (weight/weight in water) of the cationic polyelectrolytes Agefloc C1405, Agefloc B50, Agefloc WT40 and Agefloc A50 LV which have estimated molecular weights in the range 10,000 to 400,000 as outlined above. Doze rates of 5 lbs/t were used for all the individual cationic polyelectrolyte treatment experiments.

FIG. 5 shows the impact of these cationic polyelectrolyte treatments on the particle size curve of Microna S-90 HB. From this figure it can be seen that all of the polymer treatments chosen selectively aggregate the fines component of the feed mineral slurry. The mean particle size of the resultant products and surface charges are as follows:

| Polymer (5 lbs/t) | Mean particle size (microns) | Surface charge (ueg/g) |
| --- | --- | --- |
| None (feed) | 0.58 | −37.0 |
| Agequat C1405 | 2.82 | −10.6 |
| Agefloc B50 | 3.51 | −7.66 |
| Agefloc WT40 | 2.27 | −6.89 |
| Agefloc A50 LV | 2.28 | −8.00 |

EXAMPLE 31

To a feed mineral suspension composed of Microna S-80 B at 10% solids in water, containing 80% by weight of particles finer than two microns and 40% by weight of particles finer than 0.5 microns, was added 2.5 lbs/t of a 1.0% solution of the cationic polyelectrolyte Agefloc WT50 SLV and 2.5 lbs/t of a 1.0% solution of the cationic polyelectrolyte Agefloc B50, with mixing. FIG. 18 displays the data from this experiment. These data show that combinations of cationic polyelectrolytes can be effectively used to treat the feed mineral slurry, resulting in a product that contains no fine particles free in suspension.

EXAMPLE 32

A sample of Microna S-80 B, which is a commercially available, anionically dispersed, ground calcium carbonate pigment slurry containing 80% by weight of particles finer than 2 microns and 40% by weight of particles finer than 0.5 microns, was diluted to a solids level of 10% with water. To this feed mineral suspensions was added, with stirring, a solution of 1.0% (weight/weight in water) of alum. Dose rates of 5, 10, and 20 lbs/t alum to Microna S-80 B (dry on dry) were used in the experiments.

The data displayed in FIG. 20 show the impact of the addition of alum on the particle size curve of Microna S-80 B. From these data it can be seen that at a doze rate of 20 lbs/t aggregation of the fines present in the feed mineral slurry takes place such that no fines are present in the sample after the treatment process. The particle surface charge was changed from −21.3 ueg/g for the feed mineral slurry Microna S-80 B to +4.86 ueg/g for the aggregated product of this invention.

EXAMPLE 33

A sample of Microna S-65 which is a commercially available, anionically dispersed, ground calcium carbonate coating pigment slurry containing 65% by weight of particles finer than 2 microns and 28% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 3 lbs/t Agefloc WT50 SLV to Microna S-65 (dry on dry) was added to the feed mineral slurry.

The particle charge of the Microna S-65 feed mineral slurry was reduced from −18.6 ueg/g to −10.4 ueg/g with the addition of 3 lbs/t Agefloc WT50 SLV. The median particle diameter of the treated mineral slurry increased from a value of 1.3 microns for the feed material to 2.39 microns.

Figure 30:
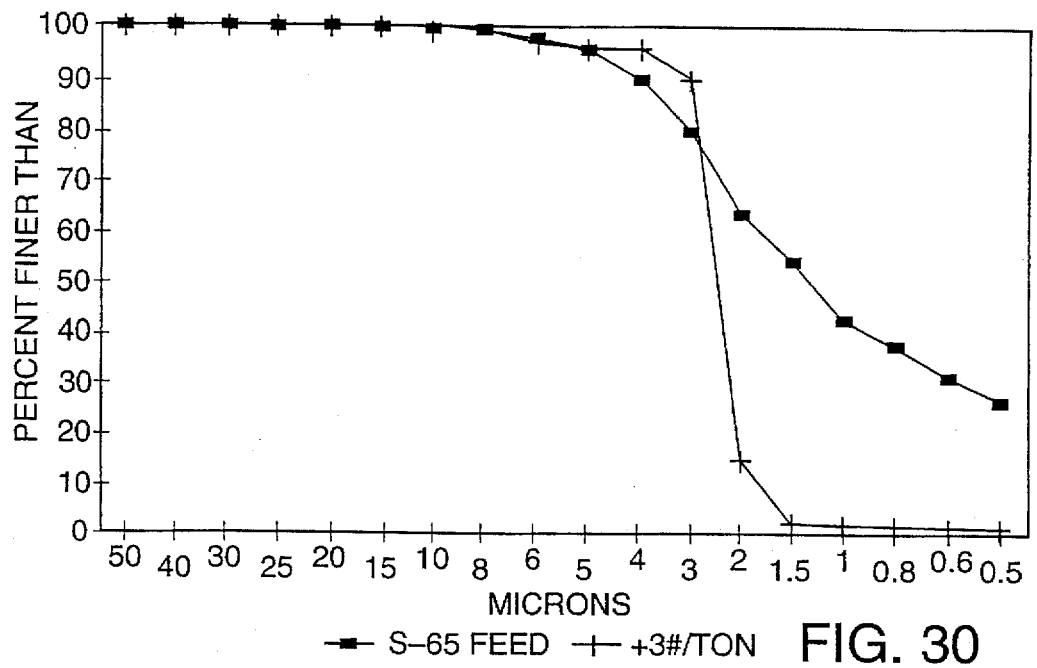
FIG. 30: Displays the effect of an addition of 3 lbs/t of the cationic polyelectrolyte Agefloc WT50 SLV on the particle size distribution of Microna S-65.

FIG. 30 shows the particle size curve of Microna S-65 after treatment with 3 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

EXAMPLE 34

A sample of Microna S-65 which is a commercially available, anionically dispersed, ground calcium carbonate coating pigment slurry containing 65% by weight of particles finer than 2 microns and 28% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 5 lbs/t Agefloc WT50 SLV to Microna S-65 (dry on dry) was added to the feed mineral slurry.

The particle charge of the Microna S-65 feed mineral slurry was reduced from −18.6 ueg/g to −6.20 ueg/g with the addition of 5 lbs/t Agefloc WT50 SLV. The median particle diameter of the treated mineral slurry increased from a value of 1.3 microns for the feed material to 2.86 microns.

Figure 31:
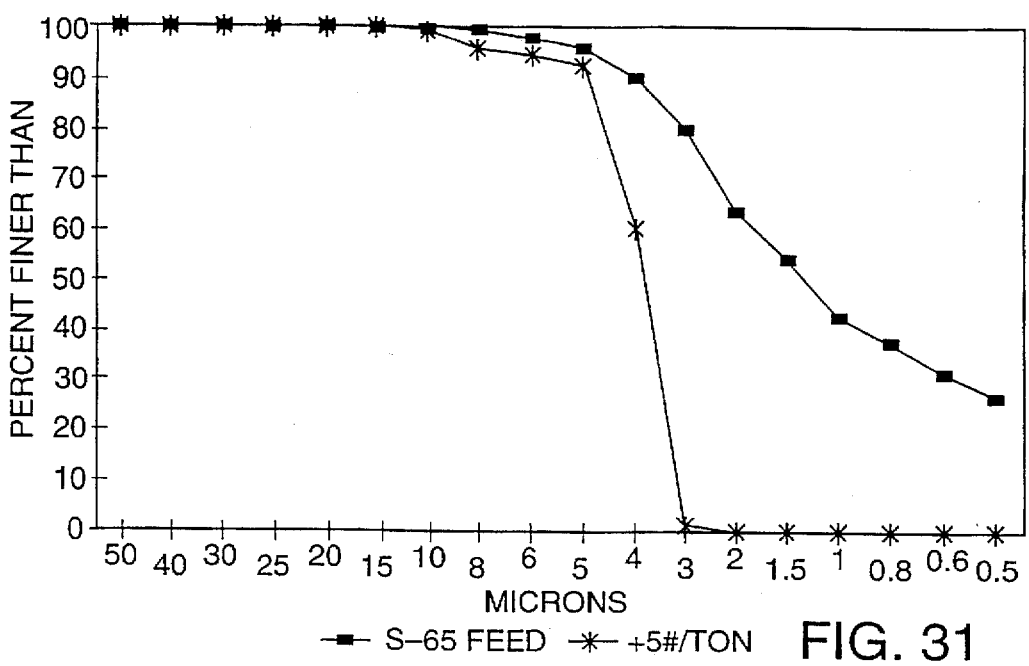
FIG. 31: Displays the effect of an addition of 5 lbs/t of the cationic polyelectrolyte Agefloc WT50 SLV on the particle size distribution of Microna S-65.

FIG. 31 shows the particle size curve of Microna S-65 after treatment with 5 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

EXAMPLE 35

A sample of Microna S-90 HB which is a commercially available, anionically dispersed, ground calcium carbonate coating pigment slurry containing 90% by weight of particles finer than 2 microns and 45% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 3 lbs/t Agefloc WT50 SLV to Microna S-90 HB (dry on dry) was added to the feed mineral slurry.

The particle charge of the Microna S-90 HB feed mineral slurry was reduced from −34.4 ueg/g to −23.3 ueg/g with the addition of 3 lbs/t Agefloc WT50 SLV. The median particle diameter of the treated mineral slurry increased from a value of 0.58 microns for the feed material to 2.46 microns.

Figure 32:
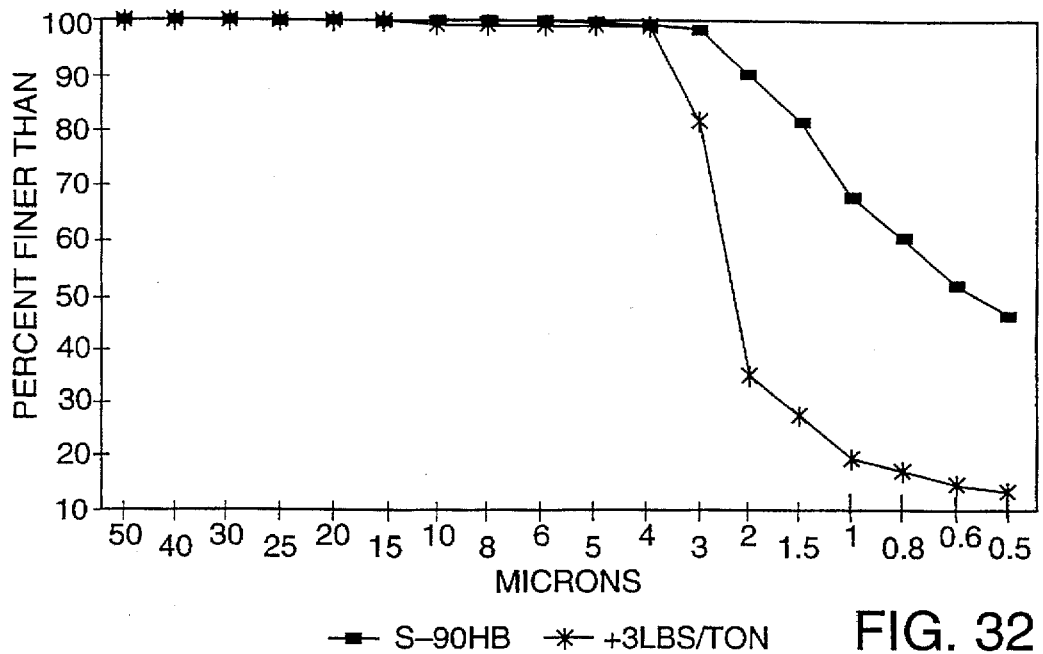
FIG. 32: Displays the effect of an addition of 3 lbs/t of the cationic polyelectrolyte Agefloc WT50 SLV on the particle size distribution of Microna S-90 HB.

FIG. 32 shows the particle size curve of Microna S-90 HB after treatment with 3 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

EXAMPLE 36

A sample of Microna S-90 HB which is a commercially available, anionically dispersed, ground calcium carbonate coating pigment slurry containing 90% by weight of particles finer than 2 microns and 45% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 5 lbs/t Agefloc WT50 SLV to Microna S-90 HB (dry on dry) was added to the feed mineral slurry.

The particle charge of the Microna S-90 HB feed mineral slurry was reduced from $-18.6$ ueg/g to $-6.20$ ueg/g with the addition of 5 lbs/t Agefloc WT50 SLV. The median particle diameter of the treated mineral slurry increased from a value of 0.58 microns for the feed material to 2.35 microns.

Figure 29:
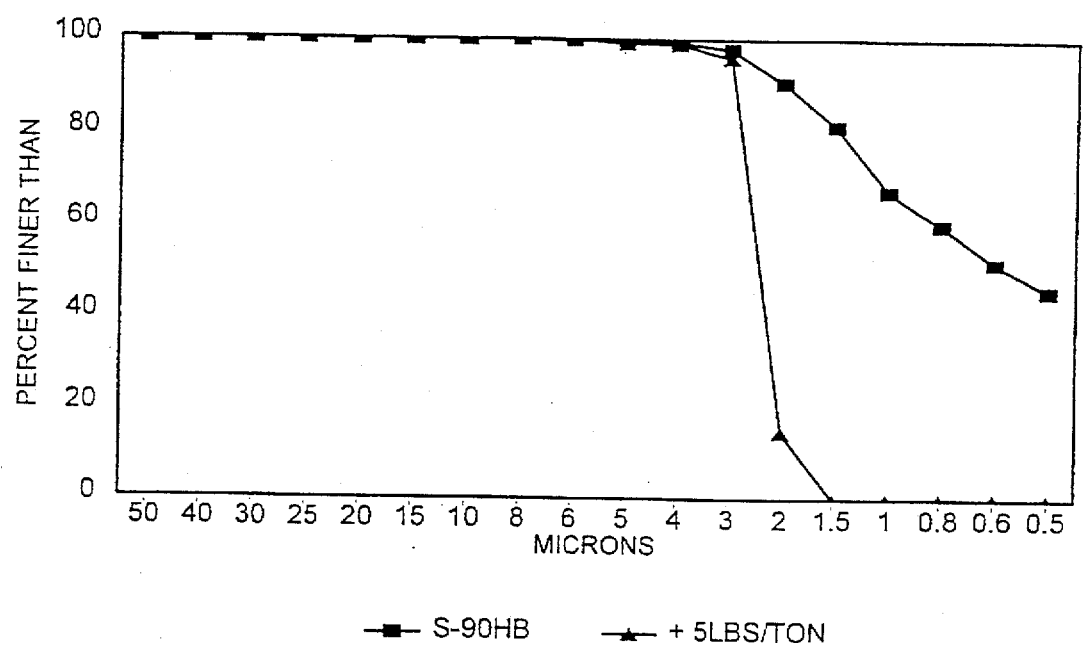
FIG. 29: Displays the effect of an addition of 5 lbs/t of the cationic polyelectrolyte Agefloc WT50 SLV on the particle size distribution of Microna S-90 HB.

FIG. 29 shows the particle size curve of Microna S-90 HB after treatment with 5 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

EXAMPLE 37

A sample of Microna S-93 which is a commercially available, anionically dispersed, ground calcium carbonate coating pigment slurry containing 95% by weight of particles finer than 2 microns and 47% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 3 lbs/t Agefloc WT50 SLV to Microna S-93 (dry on dry) was added to the feed mineral slurry.

The particle charge of the Microna S-93 feed mineral slurry was reduced from $-38.4$ ueg/g to $-28.9$ ueg/g with the addition of 3 lbs/t Agefloc WT50 SLV. The median particle diameter of the treated mineral slurry increased from a value of 0.56 microns for the feed material to 0.89 microns.

Figure 33:
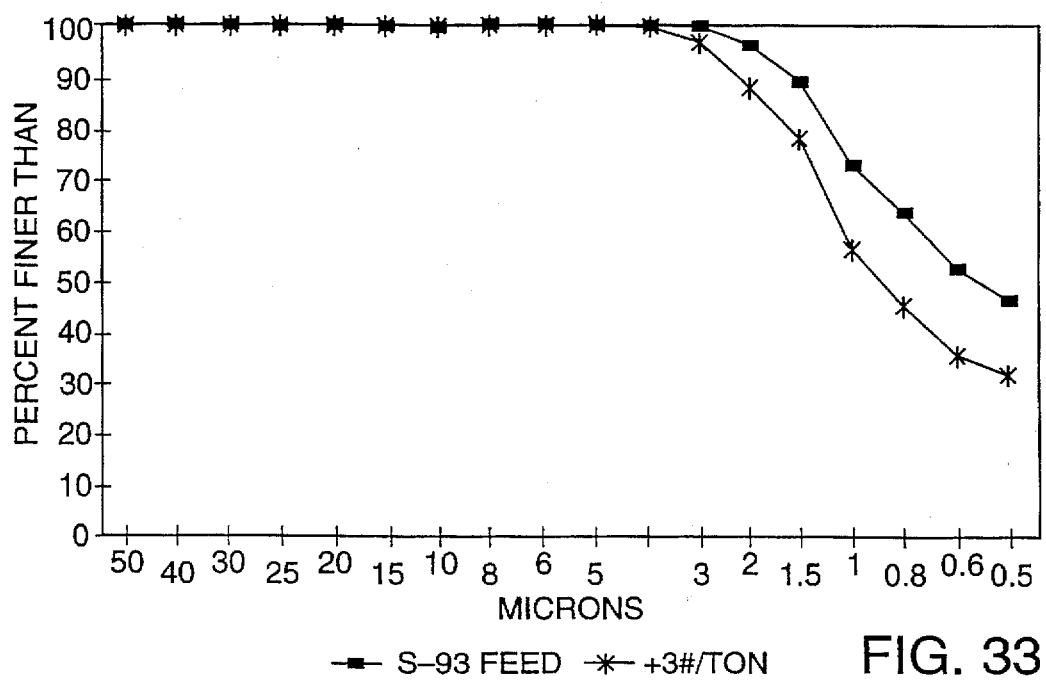
FIG. 33: Displays the effect of an addition of 3 lbs/t of the cationic polyelectrolyte Agefloc WT50 SLV on the particle size distribution of Microna S-93.

FIG. 33 shows the particle size curve of Microna S-93 after treatment with 3 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

EXAMPLE 38

A sample of Microna S-93 which is a commercially available, anionically dispersed, ground calcium carbonate coating pigment slurry containing 95% by weight of particles finer than 2 microns and 47% by weight of particles finer than 0.5 microns, was diluted to 10% solids by weight in water. To this feed mineral suspension was added, with stirring, a solution of 1.0% (weight/weight in water) of the cationic polyelectrolyte Agefloc WT50 SLV which has an estimated molecular weight between 10,000 and 50,000. A doze rates of 5 lbs/t Agefloc WT50 SLV to Microna S-93 (dry on dry) was added to the feed mineral slurry.

The particle charge of the Microna S-93 feed mineral slurry was reduced from $-38.4$ ueg/g to $-20.5$ ueg/g with the addition of 5 lbs/t Agefloc WT50 SLV. The median particle diameter of the treated mineral slurry increased from a value of 0.56 microns for the feed material to 1.63 microns.

FIG. 9 shows the particle size curve of Microna S-93 after treatment with 5 lbs/t of Agefloc WT50 SLV. As can be seen, treatment of the feed mineral slurry with the low molecular weight polyelectrolyte selectively agglomerates the fine particles present in the feed mineral slurry.

A large sample of the treated mineral slurry was dewatered with a laboratory centrifuge and re-slurried to form a pigment suspension with a solids content greater than 60%. This pigment is of sufficiently high enough solids such that it can be incorporated into a paper coating formulation.

While the present invention has been particularly set forth in terms of specific embodiments therefore, it will be understood in view of the instant disclosure, that numerous variations upon the invention are now enabled to those skilled in the art, which variations yet reside within the scope and spirit of the claims now appended hereto.

I claim:

1. A method for producing pigments for filling paper and paper board, comprising the steps of:
   (a) providing an aqueous ionically dispersed slurry comprising from about 0.1 percent to about 10 percent mineral particles by weight, the slurry containing fine and ultra-fine particles; and
   (b) adding at least 5 pounds of a low molecular weight ionically charged agent per ton of mineral particle to the slurry to selectively aggregate the fine and ultra-fine particles present in the slurry, wherein the ionically charged agent is of opposite charge to the slurry.

2. The method of claim 1 wherein the aqueous ionically dispersed slurry comprises ground natural calcium carbonate or synthetically produced calcium carbonate.

3. A pigment for filling paper and paper board formed according to the process of claim 1.

4. The pigment of claim 3 wherein the aqueous ionically dispersed slurry comprises ground natural calcium carbonate or synthetically produced calcium carbonate.

5. A method for producing kaolin pigments for filling paper and paper board, comprising the steps of:
   (a) providing an anionically dispersed hydrous kaolin clay mineral pigment slurry; and
   (b) adding a low molecular weight cationically charged agent to the slurry to selectively aggregate the fine and ultra-fine particles present in the slurry.

6. A kaolin pigment for filling paper and paper board formed according to the process of claim 5.

7. A method for producing pigments for coating paper and paper board, comprising the steps of:
- (a) providing an aqueous anionically dispersed slurry comprising from about 0.1 percent to about 10 percent mineral particles by weight, the slurry containing fine and ultra-fine particles;
- (b) adding a low molecular weight cationically charged agent to the slurry to selectively aggregate the fine and ultra-fine particles present in the slurry; and
- (c) dewatering the aggregated slurry.

8. The method of claim 7 wherein the anionically dispersed slurry comprises ground natural calcium carbonate or synthetically produced calcium carbonate.

9. A pigment for coating paper and paper board formed according to the process of claim 7.

10. The pigment of claim 9 wherein the anionically dispersed slurry comprises ground natural calcium carbonate or synthetically produced calcium carbonate.

* * * * *

UNITED STATES PATENT AND TRADEMARK OFFICE
CERTIFICATE OF CORRECTION

PATENT NO. : 5,676,746

DATED: October 14, 1997

INVENTOR(S): Alan J. Brown

It is certified that error appears in the above-identified patent and said Letters Patent is hereby corrected as shown below:

Column 2, line 24, "bull" should read --bulk--.

Column 4, line 53, "freer" should read --finer--.

Column 5, line 40, "filing" should read --filling--.

Column 6, line 19, "theological" should read --rheological--.

Column 6, line 63, "theology" should read --rheology--.

Column 9, line 51, "quantifies" should read --quantities--.

Column 12, line 27, "Agefloc C1405" should read --Agequat C1405--.

Column 12, line 36, "1,000,000" should read --3,000,000--.

Column 13, line 10, "free fraction" should read --fine fraction--.

Column 13, line 17, "the free range" should read --the fine range--.

Column 14, line 8, "Agefloc C1405" should read --Agequat C1405--.

Column 15, line 42, "Agefloc C1405" should read --Agequat C1405--.

Column 16, line 20, "Agefloc" should read --Agequat--.

UNITED STATES PATENT AND TRADEMARK OFFICE
CERTIFICATE OF CORRECTION

PATENT NO. : 5,676,746
DATED : October 14, 1997
INVENTOR(S) : Alan J. Brown

It is certified that error appears in the above-identified patent and that said Letters Patent is hereby corrected as shown below:

Column 18, line 9, "free particles" should read --fine particles--.

Column 18, line 20, "Agefloc C1405" should read --Agequat C1405--.

Column 21, line 30, "SX 1000which" should read --SX 1000 which--.

Column 24, line 12, "free" should read --fine--.

Signed and Sealed this

Twenty-ninth Day of December, 1998

Attest:

BRUCE LEHMAN

Attesting Officer

Commissioner of Patents and Trademarks